(12) United States Patent
Stewart

(10) Patent No.: US 8,658,556 B2
(45) Date of Patent: Feb. 25, 2014

(54) CATALYST SYSTEMS COMPRISING MULTIPLE NON-COORDINATING ANION ACTIVATORS AND METHODS FOR POLYMERIZATION THEREWITH

(75) Inventor: Ian C. Stewart, Houston, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 13/478,514

(22) Filed: May 23, 2012

(65) Prior Publication Data

US 2012/0316302 A1 Dec. 13, 2012

Related U.S. Application Data

(60) Provisional application No. 61/494,730, filed on Jun. 8, 2011.

(51) Int. Cl.
- C08F 4/603 (2006.01)
- C08F 4/6192 (2006.01)
- C08F 4/643 (2006.01)
- C08F 4/6592 (2006.01)

(52) U.S. Cl.
USPC ........... 502/202; 502/103; 502/114; 502/152; 526/133; 526/134; 526/160; 526/943

(58) Field of Classification Search
USPC .......... 526/133, 134, 160, 943; 502/103, 114, 502/202, 152
See application file for complete search history.

(56) References Cited

U.S. PATENT DOCUMENTS

| | | | |
|---|---|---|---|
| 5,153,157 A | 10/1992 | Hlatky et al. | |
| 5,241,025 A | 8/1993 | Hlatky et al. | |
| 5,387,568 A | 2/1995 | Ewen et al. | |
| 5,453,410 A | 9/1995 | Kolthammer et al. | |
| 5,648,438 A | 7/1997 | Henry et al. | |
| 6,147,173 A | 11/2000 | Holtcamp | |
| 6,175,409 B1 | 1/2001 | Nielsen et al. | |
| 6,211,105 B1 | 4/2001 | Holtcamp | |
| 6,260,407 B1 | 7/2001 | Petro et al. | |
| 6,294,388 B1 | 9/2001 | Petro | |
| 6,306,658 B1 | 10/2001 | Turner et al. | |
| 6,406,632 B1 | 6/2002 | Safir et al. | |
| 6,436,292 B1 | 8/2002 | Petro | |
| 6,454,947 B1 | 9/2002 | Safir et al. | |
| 6,455,316 B1 | 9/2002 | Turner et al. | |
| 6,461,515 B1 | 10/2002 | Safir et al. | |
| 6,475,391 B2 | 11/2002 | Safir et al. | |
| 6,489,168 B1 | 12/2002 | Wang et al. | |
| 6,491,816 B2 | 12/2002 | Petro | |
| 6,491,823 B1 | 12/2002 | Safir et al. | |
| 2002/0032120 A1 | 3/2002 | Babb et al. | |
| 2005/0159299 A1 | 7/2005 | Rodriguez et al. | |
| 2006/0009595 A1 | 1/2006 | Rix et al. | |
| 2009/0264608 A1 | 10/2009 | Wakatsuki et al. | |
| 2010/0029873 A1 | 2/2010 | Crowther et al. | |

FOREIGN PATENT DOCUMENTS

| | | |
|---|---|---|
| EP | 0 277 003 | 8/1988 |
| EP | 0 277 004 | 8/1988 |
| EP | 0 426 637 | 5/1991 |
| EP | 0 570 982 | 11/1993 |
| EP | 0 573 120 | 12/1993 |
| EP | 0 573 403 | 12/1993 |
| EP | 0 811 627 | 12/1997 |
| WO | WO 94/07928 | 4/1994 |
| WO | WO 95/14044 | 5/1995 |
| WO | WO 00/09255 | 2/2000 |
| WO | WO 00/09514 | 2/2000 |
| WO | WO 2008/146215 | 12/2008 |

OTHER PUBLICATIONS

Wei et al., *Programmable Modulation of Co-monomer Relative Reactivities for Living Coordination Polymerization Through Reversible Chain Transfer Between "Tight" and "Loose" Ion Pairs*, Angew. Chem. Int. Ed., 2010, vol. 49, No. 48, pp. 9140-9144.

Boussie, et al., *A Fully Integrated High-Throughput Screening Methodology for the Discovery of New Polyolefin Catalysts: Discovery of a New Class of High Temperature Single-Site Group (IV) Copolymerization Catalysts*, Journal of American Chemical Society, 2003, vol. 125, No. 14, pp. 4306-4317.

Volkis, et al., *Unusual Synergetic Effect of Cocatalysts in the Polymerization of Propylene by a Zirconium Bis-(benzamidinate) Dimethyl Complex*, Organometallics, 2006, vol. 25, No. 11, pp. 2722-2724.

Wei, et al., *Programmable Modulation of Comonomer Relative Reactivities for Living Coordination Polymerization through Reversible Chain Transfer between "Tight" and "Loose" Ion Pairs*, Angew. Chem. Int. Ed., 2010, vol. 49, pp. 1-6.

Primary Examiner — Caixia Lu
(74) Attorney, Agent, or Firm — Catherine L. Bell

(57) ABSTRACT

This invention relates to a method to polymerize olefins comprising contacting olefins with a catalyst system comprising a transition metal catalyst compound and: 1) at least two NCA activators represented by the formula: $Z_d^+ (A^{d-})$, where Z is a Bronsted acid or a reducible Lewis acid, $A^{d-}$ is a boron containing NCA, d is 1, 2, or 3, and where Z is a Bronsted acid and Z is a reducible Lewis acid in the first and second NCA activators, respectively; or 2) at least two NCA activators, one as described in Formula I and one not as described in Formula I; or 3) two NCA activators as described in Formula I except that the N in the second NCA in the ArNHal is at a different position in the nitrogen containing aromatic ring than the N in the first NCA.

45 Claims, 5 Drawing Sheets

Ion pairing between activated catalysts and NCAs.

Activators and the catalyst used in Experiments 1-24.

GPC for Example 11 (Activator A+C)

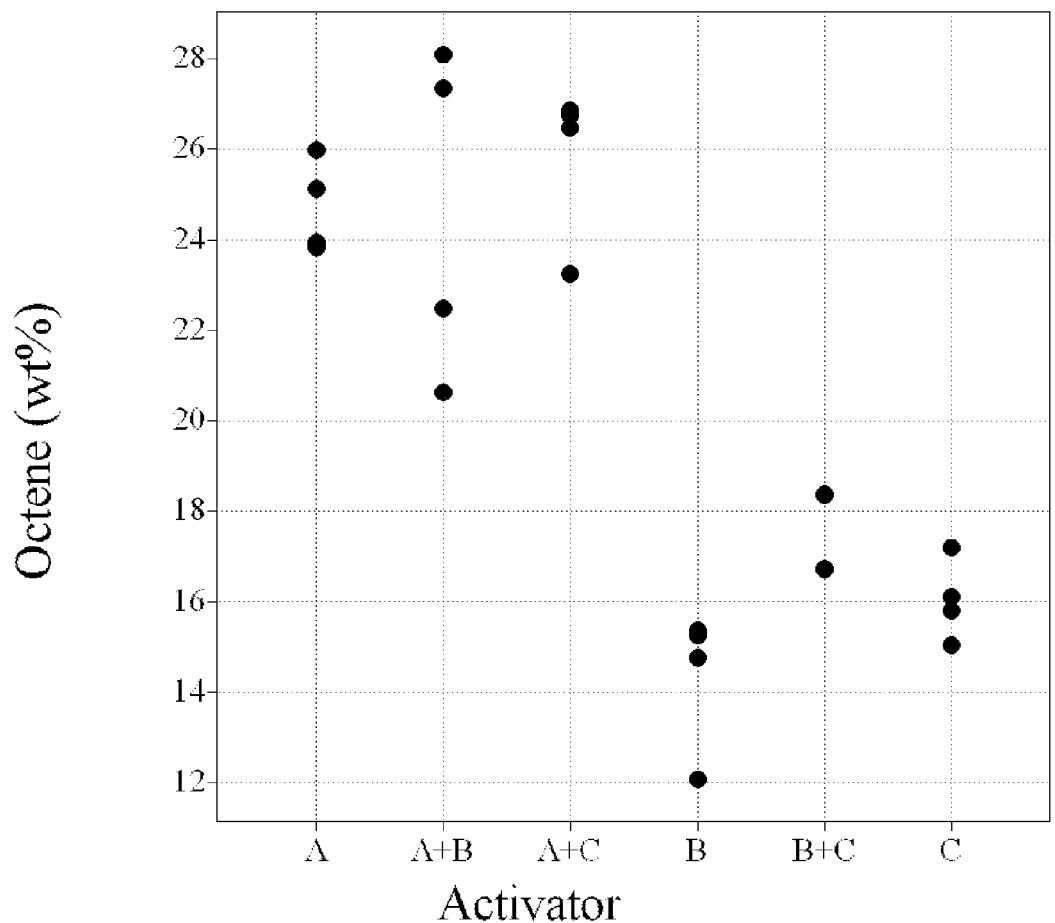

CATALYST SYSTEMS COMPRISING MULTIPLE NON-COORDINATING ANION ACTIVATORS AND METHODS FOR POLYMERIZATION THEREWITH

PRIORITY CLAIM

This application claims priority to and the benefit of 61/494,730, filed Jun. 8, 2011.

FIELD OF THE INVENTION

This invention relates to polymerization processes using metallocene catalyst systems comprising a metallocene catalyst compound and at least two different non-coordinating anion activators.

BACKGROUND OF THE INVENTION

Single-site catalyst compounds, such as metallocenes, are often paired with methyl alumoxane or a non-coordinating anion activator to polymerize monomers, such as olefins. These catalysts are regarded as precise and often produce polymers having both narrow molecular weight distribution (Mw/Mn) and narrow composition distribution.

The precision of single-site metallocene catalysts is, however, also a limitation in that narrower distribution in polymer molecular weight and/or compositional distribution can hinder post-reactor processing. The ability to systematically control this distribution in a novel way would be useful.

It is thought that the structure of both the catalyst and the activator can affect the reactivity of the resulting activated catalyst ion pair. This can frequently lead to differences in molecular weight and comonomer content for the resulting polymer products. While multiple catalyst/activator pairings have been employed in the past, the use of a single catalyst with multiple non-coordinating anion activators has not been described.

Combinations of activators have been described in U.S. Pat. Nos. 5,153,157; 5,453,410; EP 0 573 120 B1; WO 94/07928; WO 95/14044; and "*Unusual Synergistic Effect of Cocatalysts in the Polymerization of Propylene by a Zirconium Bis(benzamidinate)Dimethyl Complex*" Volkis, et al., Organometallics, 2006, 25, pp. 2722-2724. These documents all discuss the use of an alumoxane in combination with an ionizing activator.

Two step activation sequences have also been described in WO 2008/146215, where alumoxane was staggered with an organylaluminum compound. Likewise, WO 00/09514 discloses tris(perfluorophenyl) aluminum combined with di(isobutyl)(2,6-ditert-butyl-4-methylphenoxy)aluminum to form two aluminum activators for (t-butylamido)dimethyl (tetramethyl-cyclopentadienyl)silanetitanium 1,3 pentadiene; or dimethylsilane bis(2-methyl-4-phenylindenyl)zirconium 1,4 diphenyl-1,3 butadiene; or (t-butylamido) (tetramethylcyclopentadienyl)dimethylsilane titanium dimethyl; or rac dimethylsilyl bis(1-indenyl) zirconium dimethyl.

Wei et al., in "*Programmable Modulation of Comonomer Relative Reactivities for Living Coordination Polymerization through Reversible Chain Transfer between "Tight" and "Loose" Ion Pairs*", Angew. Chem. Int. Ed. 2010, 49, pp. 9140-9144, disclose use of diethyl zinc in combination with [PhNHMe$_2$][B(C$_6$F$_5$)$_4$].

Other references of interest include EP 0 426 637; EP 0 573 403; EP 0 277 004; EP 0 277 003; EP 0 811 627; U.S. Pat. Nos. 6,147,173; 5,387,568; 5,648,438; and U.S. 2010/0029873.

None of the above references disclose two boron containing non-coordinating anion activators to produce polymers having different populations. Likewise, none of the above references disclose combinations of Group 13 element activator complexes comprising at least one halogenated, nitrogen containing aromatic group.

In view of the above, there is a continuing need for activating cocatalyst compounds both to improve industrial economics and to provide simpler methods of synthesis and preparation of suitable polymers. Additionally, improvements in gas phase and slurry polymerization of olefins, where supported catalysts are typically used, are sought so as to meet the demanding criteria of industrial processes.

SUMMARY OF THE INVENTION

This invention relates to a method to polymerize olefins comprising contacting one or more olefins with a catalyst system comprising a transition metal catalyst compound and at least two boron containing NCA activators represented by the formula:

$$Z_d^+ (A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3; where in the first NCA activator Z is a Bronsted acid and in the second NCA activator Z is a reducible Lewis acid.

This invention also relates to a method to polymerize olefins comprising contacting one or more olefins with a catalyst system comprising a transition metal catalyst compound and at least two NCA activators, where at least one NCA activator comprises an anion as described in Formula I and at least one NCA activator does not comprise an anion as described in Formula I, where Formula I is:

$$R_n M(ArNHal)_{4-n} \quad (I)$$

where R is a monoanionic ligand; M is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically NCAs comprising an anion of Formula I also comprises a suitable cation that is essentially non-interfering with the ionic catalyst complexes formed with the transition metal compounds.

This invention also relates to a method to polymerize olefins comprising contacting one or more olefins with a catalyst system comprising a transition metal catalyst compound and at least two NCA activators, where the two NCA activators comprise an anion as described in Formula I except that the N in the second NCA in the ArNHal is at a different position in the nitrogen containing aromatic ring than the N in the first NCA, where Formula I is:

$$R_n M(ArNHal)_{4-n} \quad (I)$$

where R is a monoanionic ligand; M is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the each of the NCAs comprising an anion of Formula I also comprises a suitable cation that is essentially non-interfering with the ionic catalyst complexes formed with the transition metal compounds.

This invention also relates to the catalyst system useful in the methods above.

BRIEF DESCRIPTION OF THE FIGURES

FIG. 6 is a chart of the comonomer (octene) incorporation's of polymers produced in Examples 1-24.

DETAILED DESCRIPTION

Figure 1:
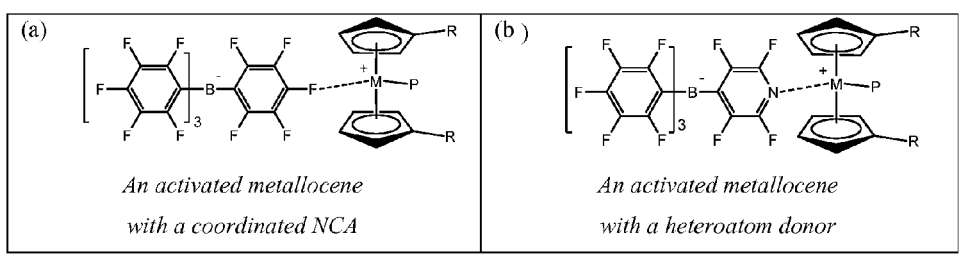
FIG. 1 is a chart of the ion pairing between activated catalysts and non-coordinating anions, where R is $C_1$ to $C_{40}$ substituted or unsubstituted hydrocarbyl, and p is a polymer chain.

For the purposes of this invention and the claims thereto, the new numbering scheme for the Periodic Table Groups is used as in CHEMICAL AND ENGINEERING NEWS, 63 (5), pg. 27 (1985).

"Catalyst productivity" is a measure of how many grams of polymer (P) are produced using a polymerization catalyst comprising W g of catalyst (cat), over a period of time of T hours; and may be expressed by the following formula: $P/(T \times W)$ and expressed in units of $gPgcat^{-1} hr^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. Accordingly, the definition of copolymer, as used herein, includes terpolymers and the like. A "terpolymer" is a polymer having three mer units that are different from each other. "Different" as used to refer to mer units indicates that the mer units differ from each other by at least one atom or are different isomerically. An "ethylene polymer" or "ethylene copolymer" is a polymer or copolymer comprising at least 50 mol % ethylene derived units. A "propylene polymer" or "propylene copolymer" is a polymer or copolymer comprising at least 50 mol % propylene derived units.

For the purposes of this invention, ethylene shall be considered an α-olefin.

For purposes of this invention and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

This invention relates to a method to polymerize olefins comprising contacting olefins (preferably $C_2$ to $C_{40}$ olefins, preferably $C_2$ to $C_{20}$ alpha olefins, preferably ethylene, propylene, butene, pentene, hexene, heptene, octene, nonene, decene, undecene dodecene, and isomers thereof) with a catalyst system comprising a transition metal catalyst compound and at least two boron containing NCA activators represented by the formula (14):

$$Z_d^+ (A^{d-}) \qquad (14)$$

where: Z is (L-H) or a reducible Lewis acid; L is an neutral Lewis base; H is hydrogen; (L-H) is a Bronsted acid; $A^{d-}$ is a boron containing non-coordinating anion having the charge d−; d is 1, 2, or 3; where in the first NCA activator Z is a Bronsted acid and in the second NCA activator Z is a reducible Lewis acid.

This invention also relates to a method to polymerize olefins comprising contacting olefins (preferably $C_2$ to $C_{40}$ olefins, preferably $C_2$ to $C_{20}$ alpha olefins, preferably ethylene, propylene, butene, pentene, hexene, heptene, octene, nonene, decene, undecene dodecene, and isomers thereof) with a catalyst system comprising a transition metal catalyst compound and at least two NCA activators, where at least one NCA activator comprises an anion as described in Formula I and at least one NCA activator does not comprise an anion as described in Formula I, where Formula I is:

$$R_nM(ArNHal)_{4-n} \qquad (I)$$

where R is a monoanionic ligand; M is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula I also comprises a suitable cation that is essentially non-interfering with the ionic catalyst complexes formed with the transition metal compounds, preferably the cation is $Z_d^+$ as described in Formula 14.

This invention also relates to a method to polymerize olefins comprising contacting olefins (preferably $C_2$ to $C_{40}$ olefins, preferably $C_2$ to $C_{20}$ alpha olefins, preferably ethylene, propylene, butene, pentene, hexene, heptene, octene, nonene, decene, undecene dodecene, and isomers thereof) with a catalyst system comprising a transition metal catalyst compound and at least two NCA activators, where the two NCA activators comprise an anion as described in Formula I except that the N in the second NCA in the ArNHal is at a different position in the nitrogen containing aromatic ring than the N in the first NCA, where Formula I is:

$$R_nM(ArNHal)_{4-n}, \qquad (I)$$

where R is a monoanionic ligand; M is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the two NCAs comprising an anion of Formula I each also comprise a suitable cation that is essentially non-interfering with the ionic catalyst complexes formed with the transition metal compounds, preferably the cation is $Z_d^+$ as described in Formula 14.

In another embodiment, this invention relates to a catalyst system comprising a transition metal catalyst compound and at least two boron containing non-coordinating anion "NCA" activators represented by the Formula (14):

$$Z_d^+ (A^{d-}) \quad (14)$$

where Z is (L-H) or a reducible Lewis acid; L is an neutral Lewis base; H is hydrogen; (L-H) is a Bronsted acid; $A^{d-}$ is a boron containing non-coordinating anion having the charge d−; d is 1, 2, or 3; where in the first NCA activator Z is a Bronsted acid and in the second NCA activator Z is a reducible Lewis acid, preferably in the second NCA $Z_d^+$ is triphenylcarbonium.

In a preferred embodiment, this invention also relates to a catalyst system comprising a transition metal catalyst compound and at least two non-coordinating anion "NCA" activators, where at least one NCA activator comprises an anion as described in Formula I and at least one NCA activator does not comprise an anion as described in Formula I (but preferably the NCA is described by Formula 14 above), where Formula I is:

$$R_nM(ArNHal)_{4-n} \quad (I)$$

where R is a monoanionic ligand; M is a Group 13 metal or metalloid (preferably Al or B); ArNHal is a halogenated, nitrogen-containing aromatic ring, polycyclic aromatic ring, or aromatic ring assembly in which two or more rings (or fused ring systems) are joined directly to one another or together (preferably one or more of tetrafluoropyridine, hexafluoroquinoline, or hexafluoroisoquinoline); and n is 0, 1, 2, or 3. Typically the NCA comprising an anion of Formula I also comprises a suitable cation that is essentially non-interfering with the ionic catalyst complexes formed with the transition metal compounds, preferably the cation is $Z_d^+$ as described in Formula 14.

In a preferred embodiment, this invention also relates to a catalyst system comprising a transition metal catalyst compound and at least two non-coordinating anion "NCA" activators, where the two NCA activators comprise anions as described in Formula I except that the N in the second NCA in the ArNHal is at a different position in the nitrogen containing aromatic ring than the N in the first NCA, where Formula I is:

$$R_nM(ArNHal)_{4-n} \quad (I)$$

where R is a monoanionic ligand; M is a Group 13 metal or metalloid (preferably Al or B); ArNHal is a halogenated, nitrogen-containing aromatic ring, polycyclic aromatic ring, or aromatic ring assembly in which two or more rings (or fused ring systems) are joined directly to one another or together (preferably one or more of tetrafluoropyridine, hexafluoroquinoline, or hexafluoroisoquinoline); and n is 0, 1, 2, or 3. Typically the two NCAs comprising an anion of Formula I each also comprise a suitable cation that is essentially non-interfering with the ionic catalyst complexes formed with the transition metal compounds, preferably the cation is $Z_d^+$ as described in Formula 14.

In a preferred embodiment in any of the catalyst systems containing an NCA represented by Formula 14 described above, the reducible Lewis acid is represented by the formula: $(Ar_3C^+)$, where Ar is aryl or aryl substituted with a heteroatom, a $C_1$ to $C_{40}$ hydrocarbyl, or a substituted C1 to C40 hydrocarbyl, preferably the reducible Lewis acid represented by the formula: $(Ph_3C^+)$, where Ph is phenyl or phenyl substituted with a heteroatom, a $C_1$ to $C_{40}$ hydrocarbyl, or a substituted C1 to C40 hydrocarbyl.

In a preferred embodiment in any of the catalyst systems containing an NCA represented by Formula 14 described above, $Z_d^+$ is represented by the formula: $(L-H)_d^+$, wherein L is an neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

In a preferred embodiment in any of the catalyst systems containing an NCA represented by Formula 14 described above, the anion component $A^{d-}$ is represented by the formula $[M^{k+}Q_n]^{d-}$ wherein k is 1, 2, or 3; n is 1, 2, 3, 4, 5, or 6 (preferably 1, 2, 3, or 4); n−k=d; M is boron; and Q is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide.

In a preferred embodiment in any of the catalyst systems containing an NCA comprising an anion represented by Formula I described above, R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkylsulfido, arylsulfido, alkylphosphido, arylphosphide, or other anionic substituent; fluoride; bulky alkoxides, where bulky means $C_4$ to $C_{20}$ hydrocarbyl groups; —$SR^1$, —$NR^2_2$, and —$PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

In a preferred embodiment in any of the catalyst systems containing an NCA comprising an anion represented by Formula I described above, the NCA also comprises a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the catalyst systems containing an NCA comprising an anion represented by Formula I described above, the NCA also comprises a cation represented by the formula, $(L-H)_d^+$, wherein L is an neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

The NCAs, anions, and cations included in the catalyst systems described above are themselves further described below and such further description is to be considered a part of the catalyst system descriptions above.

As noted above, the catalyst systems of this invention comprise at least two NCA activators. Without wishing to be bound by theory, the inventor has noted that the activators that are "more different" (i.e., one "non coordinating" and one "weakly coordinating", per the definition above) lead to unexpected results, such as bimodal Mw/Mn.

In a preferred embodiment, any of the activators described herein may be mixed together before or after combination with the catalyst compound and/or support, preferably before being mixed with the catalyst compound and/or support.

In a preferred embodiment, the molar ratio of the first NCA activator to the second NCA activator can be any ratio. In some embodiments, the molar ratio of the first NCA activator to the second NCA activator is 0.01:1 to 10,000:1, preferably 0.1:1 to 1000:1, preferably 1:1 to 100:1.

Further, the typical activator-to-catalyst ratio, e.g., all activator (NCAs)-to-catalyst ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Preferred combinations of activators include: 1) [Ph$_3$C$^+$][B(C$_6$F$_5$)$_4$$^-$] & [Me$_3$NH$^+$][B(C$_6$F$_5$)$_4$$^-$]; 2) [Ph$_3$C$^+$][B(C$_6$F$_5$)$_4$$^-$] & 1-(4-(tris(pentafluorophenyl)borate)-2,3,5,6-tetrafluorophenyl)pyrrolidinium; and 3) tetrakis(pentafluorophenyl)borate & 4-(tris(pentafluorophenyl)borate)-2,3,5,6-tetrafluoropyridine.

In a preferred embodiment, a triaryl carbonium (such as triphenylcarbenium tetraphenylborate, such as triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate) can be combined with one or more of the non-coordinating anions listed in the "Non Coordinating Anion Activators" section below, such as trialkylammonium tetrakis(pentafluorophenyl)borate, N,N-dialkylanilinium tetrakis(pentafluorophenyl)borate, N,N-dimethyl-(2,4,6-trimethylanilinium)tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl) ammonium tetrakis(pentafluorophenyl)borate, (where alkyl is methyl, ethyl, propyl, n-butyl, sec-butyl, or t-butyl).

In another embodiment, the first NCA is one or more of: triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate; and the second NCA is one or more of: N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, or N,N-dimethylanilinium tetrakis(3,5-bis(trifluoromethyl)phenyl)borate.

Polymers Produced

This invention also relates to polymers produced by the catalyst systems and methods described herein. In a preferred embodiment, the polymers produced herein are homopolymers and/or copolymers of one or more linear, branched, or cyclic $C_2$ to $C_{40}$ olefins, preferably $C_2$ to $C_{20}$ olefins, preferably $C_2$ to $C_{12}$ olefins, preferably alpha olefins. In a preferred embodiment, the polymer produced herein is a homopolymer of ethylene or a copolymer of ethylene and one or more comonomers selected from $C_3$ to $C_{40}$ olefins, preferably $C_3$ to $C_{20}$ olefins, or preferably $C_3$ to $C_{12}$ olefins. In a preferred embodiment, the polymer produced herein is a homopolymer of propylene or a copolymer of propylene and one or more comonomers selected from ethylene and $C_4$ to $C_{40}$ olefins, preferably $C_4$ to $C_{20}$ olefins, or preferably $C_3$ to $C_{12}$ olefins. The comonomers (e.g., for the copolymers, such as ethylene copolymers and propylene copolymers) may be linear, branched, or cyclic. The cyclic monomer may be strained or unstrained, monocyclic or polycyclic, and may optionally include heteroatoms and/or one or more functional groups. Exemplary comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, the polymer produced herein has at least 50 mol % of monomer (such as ethylene or propylene) and from 0 mol % to 50 mol % of one or more comonomers, preferably from 0.5 mol % to 45 mol % of one or more of the comonomers described above, preferably from 1 mol % to 30 mol %.

In a preferred embodiment, the polymer produced herein has at least two species or fractions that are different in Mw, Mn or Mz (as measured by Size Exclusion Chromatography as described in US 2008/0045638, paragraph [0600] et seq. including the references cited therein), molecular weight distribution (Mw/Mn), melting point (Tm), crystallization point (Tc), heat of fusion (Hf), glass transition temperature (Tg), tacticity, comonomer distribution breadth index (CDBI), and/or comonomer distribution (CD).

In another embodiment, the polymer produced herein has at least two fractions, each of which is present at least 5 wt % (preferably at least 10 wt %, preferably at least 20 wt %, preferably at least 30%, preferably at least 40 wt %), based upon the weight of the polymer. Preferably Mw's of the two fractions are different with the Mw fraction having the greater Mw being at least 50% greater than the Mw of the fraction having the lesser Mw.

The polymers produced herein may be fractionated using the preparative TREF procedure below. In a preferred embodiment, once the polymer has been fractionated, the fraction containing the largest mass is selected and subjected to characterization, such as DSC (as described below), likewise the fraction containing the second largest mass is selected and subjected to characterization, such as DSC (as described below). These are the first and second fractions (also referred to as species). Preferably, the first and second fractions show two different peak melting temperatures (Tm, as measured by DSC), preferably the Tm's are different by at least 5° C. each from the other, preferably by at least 10° C., preferably by at least 20° C., preferably by at least 30° C., preferably by at least 40° C., preferably by at least 50° C., preferably by at least 60° C., preferably by at least 70° C., preferably by at least 80° C.

Likewise, preferably the first and second fractions show two crystallization temperatures (Tc, as measured by DSC) and the Tc's are different by at least 5° C. each from the other, preferably by at least 10° C., preferably by at least 20° C., preferably by at least 30° C., preferably by at least 40° C., preferably by at least 50° C., preferably by at least 60° C., preferably by at least 70° C., preferably by at least 80° C.

Further, in a preferred embodiment, the first and second fractions show heats of fusion (Hf, as measured by DSC) that differ by at least 5 J/g, preferably at least 10 J/g different, preferably at least 20 J/g different, preferably at least 50 J/g different, preferably at least 80 J/g different.

In another embodiment, the comonomer contents of the first and second fractions differ by at least 5 mol %, preferably by at least 10 mol %, preferably by at least 20 mol %, preferably by at least 30 mol %, preferably by at least 40 mol %. A homopolymer shall be considered to have 0 mol % comonomer. Comonomer content can be measured by Fourier Transform Infrared Spectroscopy (FTIR) in conjunction with samples collected by GPC as described in Wheeler and Willis, Applied Spectroscopy, 1993, vol. 47, pp. 1128-1130.

A commercial preparative TREF instrument (Model MC2, Polymer Char S. A.) is used to fractionate the polymer into Chemical Composition Fractions. Approximately 2 g of polymer is placed into a reactor and dissolved in 200 mL of xylene, stabilized with 600 ppm of BHT, at 130° C. for approximately 60 minutes. The mixture is allowed to equilibrate for 45 minutes at 90° C., and then cooled to either 30° C. (standard procedure) or 15° C. (cryo procedure) using a cooling rate of 0.1° C./min (in event of discrepancy between the cryo procedure and the standard procedure, the cryo procedure shall be used for purposes of the claims). The temperature of the cooled mixture is increased until it is within the lowest Isolation Temperature Range to be used (see Table 2) and the mixture is heated to maintain its temperature within the specified range for 20 minutes. The mixture is sequentially filtered through a 75 micron column filter and then a 2 micron disk filter using 10 psi to 50 psi of pressurized nitrogen. The reactor is washed twice with 50 ml of xylene heated to maintain the temperature of the wash mixture within the designated temperature range and held at that temperature for 20 minutes during each wash cycle. The fractionation process is continued by introducing fresh xylene (200 mL of xylene, stabilized with 600 ppm of BHT) into the reactor, increasing the temperature of the mixture until it reaches the next highest Isolation Temperature Range in the sequence indicated in Table 2 and heating the mixture to maintain its temperature within the specified range for 20 minutes prior to filtering it as described above. The extraction cycle is sequentially repeated in this manner until the mixture has been extracted at all Isolation Temperature Ranges shown in Table 2. The extracts are independently precipitated with methanol to recover the individual polymer fractions.

TABLE 2

Preparative TREF Fractionation Isolation Temperature Ranges

| Chemical Composition Fraction Designation | | Isolation Temperature |
|---|---|---|
| Cryo Procedure | Standard Procedure | Range (° C.) |
| 1 | — | 0 to 15 |
| 2 | 1 | 15 to 36* |
| 3 | 2 | 36 to 51 |
| 4 | 3 | 51 to 59 |
| 5 | 4 | 59 to 65 |
| 6 | 5 | 65 to 71 |
| 7 | 6 | 71 to 77 |
| 8 | 7 | 77 to 83 |
| 9 | 8 | 83 to 87 |
| 10 | 9 | 87 to 91 |
| 11 | 10 | Greater than 91 |

*The Isolation Temperature Range for the Standard Procedure is 0 to 36° C.

In a preferred embodiment, the polymer produced herein has an Mw (as measured by SEC) of up to 2,000,000 g/mol, preferably from 5000 to 1,000,000 g/mol, preferably 10,000 to 500,000 g/mol, preferably 25,000 to 250,000 g/mol.

In an embodiment, the polymer produced may be isotactic, highly isotactic, syndiotactic, or highly syndiotactic propylene polymer, particularly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, the polymer produced has at least 85% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In another embodiment, the polymer produced has at least 85% syndiotacticity. Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in POLYMER CONFORMATION AND CONFIGURATION (Academic Press, New York 1969) and J. Randall in POLYMER SEQUENCE DETERMINATION, $^{13}$C-NMR METHOD (Academic Press, New York, 1977). For more information on determining tacticity please see U.S. Patent Application Publication No. 2008/0045638 and the references cited therein.

In a preferred embodiment, "different in tacticity" means that the first and second fractions differ by at least 10%, preferably at least 40%, preferably at least 100% and preferably at least 500%, relative to each other, in % mmmm pentads (if isotactic) or rrrr pentads (if syndiotactic) as determined by $^{13}$C-NMR.

In a preferred embodiment, the first and second fractions show Mw's (as measured by SEC) that differ by at least 5,000 g/mol, preferably by at least 10,000 g/mol, preferably by at least 25,000 g/mol, preferably by at least 50,000 g/mol, preferably by at least 100,000 g/mol.

By "different in molecular weight distribution" means the polymer has a multimodal molecular weight distribution of polymer species as determined by Size Exclusion Chromatography (SEC). By multimodal is meant that the SEC trace has more than one peak or inflection point. An inflection point is that point where the second derivative of the curve changes in sign (e.g., from negative to positive or vice versa). In a preferred embodiment, the polymer produced herein has a bimodal molecular weight distribution. SEC is measured as set out in U.S. Patent Application Publication No. 2008/0045638, page 36, paragraph [0600]-[0611], including any references cited therein. In another embodiment, the polymer produced herein has a multimodal molecular weight distribution, particularly polymers made of at least two NCA activators where one of the activators is represented by the formula:

where Z is a reducible Lewis acid (preferably a triarylcarbonium, preferably triphenylcarbonium); $A^{d-}$ is a non-coordinating anion having the charge d−; and d is 1, 2, or 3.

Likewise, preferably, the first and second fractions show two glass transition temperatures (Tg) that differ by at least 10%, preferably at least 40%, preferably at least 100% and preferably at least 500%, relative to each other. Tg is measured as set out in U.S. Patent Application Publication No. 2008/0045638, page 36, paragraph [0596], including any references cited therein.

In another embodiment, some polymers produced herein have a melt index (as determined by ASTM 1238 D, 2.16 kg, 190° C.) of 25 dg/min or more, preferably 50 dg/min or more, preferably 100 dg/min or more, more preferably 200 dg/min or more, more preferably 500 dg/min or more, more preferably 2000 dg/min or more.

In another embodiment, the polymer produced herein has a molecular weight distribution (Mw/Mn) of at least 2, preferably at least 5, preferably at least 10, preferably at least 20, preferably at least 50. Alternately, the polymer produced herein has an Mw/Mn of greater than 1 to 100, alternately from 1.5 to 50, alternately from 2 to 20, alternately from 2 to 5.

Unless otherwise stated, melting point (Tm), peak crystallization temperature (Tc), heat of fusion (Hf), and percent crystallinity are determined using the following procedure according to ASTM E 794-85. Differential scanning calorimetric (DSC) data is obtained using a TA Instruments Model 2910 machine or a Perkin-Elmer DSC 7 machine. In the event that the TA Instruments Model 2910 machine and the Perkin-Elmer DSC-7 machine produce different DSC data, the data from the TA Instruments Model 2910 shall be used. Samples weighing approximately 5-10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. A value of 290 J/g (B) is used as the heat of fusion for 100% crystalline polyethylene. For the semi-crystalline polymers, having appreciable crystallinity, the melting temperature is measured and reported during the second heating cycle (or second melt). For the semi-amorphous polymers, having comparatively low levels of crystallinity, the melting temperature is measured and reported during the first heating cycle. Prior to the DSC measurement, the sample is aged (typically by holding it at ambient temperature for a period up to about 5 days) or annealed to maximize the level of crystallinity.

CDBI is a measure of the composition distribution of monomer within the polymer chains. It is measured as described in WO 93/03093, with the modification that any fractions having a weight-average molecular weight ($M_w$) below 20 kg/mol are ignored in the calculation. In a preferred embodiment, the first and second fractions differ in CDBI, relative to one another, by at least 5%, preferably by at least 10%, preferably by at least 20%.

In a preferred embodiment, the first and second fractions differ in crystallinity, relative to one another, by at least 5%, preferably by at least 10%, preferably by at least 20%.

In another embodiment, the polymer produced herein using mixtures of at least two NCAs has an Mw that is less than the Mw of the polymer produced under the same conditions using the same catalyst and the first NCA alone and is less than the Mw of the polymer produced under the same conditions using the second NCA alone, preferably the Mw of the polymer produced using two NCAs is at least 10,000 g/mol less than the Mw of both of the polymers produced under the same conditions using the NCAs alone, preferably at least 15,000 g/mol less, preferably 20,000 g/mol less, preferably 30,000 g/mol less, preferably at least 40,000 g/mol less, preferably 50,000 g/mol less, preferably 75,000 g/mol less, preferably at least 100,000 g/mol less. For example, if the Mw of polymer made by racdimethylsilylbisindenylhafniumdimethyl and Activator A is 650,000 g/mol and the Mw of the polymer made with racdimethylsilylbisindenylhafniumdimethyl and Activator C under the same conditions is 750,000, then the Mw of the polymer produced using racdimethylsilylbisindenylhafniumdimethyl and Activators A and C under the same conditions is 640,000 g/mol or less.

Catalyst Systems

A "catalyst system" is a combination of at least one catalyst compound, at least two NCA activators, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst compound may be described as a catalyst precursor, a pre-catalyst compound, metallocene catalyst or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of this invention and claims thereto in relation to catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group, ethyl alcohol is an ethyl group substituted with an —OH group, and a "substituted hydrocarbyl" is a radical made of carbon and hydrogen where at least one hydrogen is replaced by a heteroatom or heteroatom containing group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

Transition metal compounds suitable as olefin polymerization catalysts by coordination or insertion polymerization in accordance with the invention include the known transition metal compounds useful in traditional Ziegler-Natta coordination polymerization and, as well, the metallocene compounds similarly known to be useful in coordination polymerization, when such compounds are capable of catalytic activation by the activators described in this invention. These will typically include Group 4-10 transition metal compounds wherein at least one metal ligand can be abstracted by the activators, particularly those ligands including hydride, alkyl, and silyl. Ligands capable of abstraction and transition metal compounds comprising them include those metallocenes described in U.S. Pat. No. 5,198,401 and WO 92/00333. Syntheses of these compounds are well known from the published literature. Additionally, where the metal ligands include halogen, amido, or alkoxy moieties (for example, biscyclopentadienyl zirconium dichloride) which are not capable of abstraction with the cocatalysts of the invention, they can be converted into suitable ligands via known alkylation reactions with organometallic compounds such as lithium or aluminum hydrides or alkyls, Grignard reagents, etc. See also EP-A1-0 570 982 for the reaction of organoaluminum compounds with dihalo-substituted metallocene compounds prior to addition of activating anion compounds.

Additional description of useful metallocene compounds which comprise, or can be alkylated to comprise, at least one ligand capable of abstraction to form a catalytically active transition metal cation appear in the patent literature, e.g., EP-A-0 129 368; U.S. Pat. Nos. 4,871,705; 4,937,299; 5,324, 800; EP-A-0 418 044; EP-A-0 591 756; WO-A-92/00333; WO-A-94/01471; and WO 97/22635. Such metallocene compounds can be described for this invention as mono- or bis-cyclopentadienyl substituted Group 3, 4, 5, or 6 transition metal compounds wherein the ancillary ligands may be themselves substituted with one or more groups and may be bridged to each other or may be bridged through a heteroatom to the transition metal. The size and constituency of the ancillary ligands and bridging elements are not critical to the preparation of the ionic catalyst systems of the invention but should be selected in the literature described manner to enhance the polymerization activity and polymer characteristics being sought.

Preferred metallocene compounds useful in the instant invention are represented by the formula:

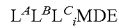

where $L^A$ is a substituted cyclopentadienyl or heterocyclopentadienyl ancillary ligand π-bonded to M; $L^B$ is a member of the class of ancillary ligands defined for $L_A$, or is J, a heteroatom ancillary ligand 6-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 or 5 transition metal (preferably Hf, Zr, or Ti); and D and E are independently monoanionic labile ligands, each having a σ-bond to M, optionally bridged to each other or $L^A$ or $L^B$, which can be broken for abstraction purposes by a suitable activator and into which a polymerizable monomer or macromonomer can insert for coordination polymerization.

Representative metallocene compounds that are useful herein include: 1) mono-cyclopentadienyl compounds, such as pentamethylcyclopentadienyltitanium isopropoxide, pentamethylcyclopentadienyltribenzyl titanium, dimethylsilyltetramethylcyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihalide, dimethylsilyltetramethylcyclopentadienyl-dodecylamido hafnium dimethyl, dimethylsilyltetramethylcyclopentadienyl-dodecylamido titanium dimethyl; 2) unbridged biscyclopentadienyl compounds, such as bis(1,3-butyl, methylcyclopentadienyl)zirconium dimethyl, pentamethylcyclopentadienyl-cyclopentadienyl zirconium dimethyl, (tetramethylcyclopentadienyl)(n-propylcyclopentadienyl) zirconium dimethyl; 3) bridged biscyclopentadienyl compounds, such as dimethylsilylbis(tetrahydroindenyl)zirconium dichloride, and silacyclobutyl(tetramethylcyclopentadienyl)(n-propyl-cyclopentadienyl)zirconium dimethyl; 4) bridged bisindenyl compounds, such as dimethylsilylbisindenyl zirconium dichloride, dimethylsilylbisindenyl hafnium dimethyl, dimethylsilylbis(2-methylbenzindenyl)zirconium dichloride, dimethylsilylbis(2-methylbenzindenyl)zirconium dimethyl; 5) fluorenyl ligand-containing compounds, such as diphenylmethyl(fluorenyl) (cyclopentadienyl)zirconium dimethyl; and 6) the additional mono- and biscyclopentadienyl compounds listed and described in U.S. Pat. Nos. 5,017,714; 5,324,800; and EP-A-0 591 756.

Preferred metallocenes, for use herein, include metallocene compounds (also referred to as metallocenes, metallocene catalyst precursors, or catalyst precursors), such as cyclopentadienyl derivatives of titanium, zirconium, and hafnium. Useful metallocenes (e.g., titanocenes, zirconocenes, and hafnocenes) may be represented by the following formulae:

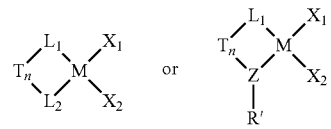

wherein M is the metal center, and is a Group 4 metal, preferably titanium, zirconium or hafnium, preferably zirconium or hafnium when $L_1$ and $L_2$ are present and preferably titanium when Z is present;

n is 0 or 1;

T is an optional bridging group which, if present, in preferred embodiments is selected from dialkylsilyl, diarylsilyl, dialkylmethyl, ethylenyl (—CH$_2$—CH$_2$—) or hydrocarbylethylenyl wherein one, two, three, or four of the hydrogen atoms in ethylenyl are substituted by hydrocarbyl, where hydrocarbyl can be independently $C_1$ to $C_{16}$ alkyl or phenyl, tolyl, xylyl and the like, and when T is present, the catalyst represented can be in a racemic or a meso form;

$L_1$ and $L_2$ are the same or different cyclopentadienyl, indenyl, tetrahydroindenyl, or fluorenyl rings, optionally substituted, that are each bonded to M, or $L_1$ and $L_2$ are the same or different cyclopentadienyl, indenyl, tetrahydroindenyl, or fluorenyl, which are optionally substituted, in which any two adjacent R groups on these rings are optionally joined to form a substituted or unsubstituted, saturated, partially unsaturated, or aromatic cyclic, or polycyclic substituent;

Z is nitrogen, oxygen, or phosphorus (preferably nitrogen);

R' is a cyclic linear or branched $C_1$ to $C_{40}$ alkyl or substituted alkyl group (preferably Z—R' forms a cyclododecylamido group);

$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin, or aryne ligand.

The term hafnocene describes a bridged or unbridged, bis- or mono-cyclopentadienyl (Cp) hafnium complex having at least two leaving groups $X_1$ and $X_2$, which are as defined immediately above and where the Cp groups may be substituted or unsubstituted cyclopentadiene, indene, or fluorene. The term zirconocene describes a bridged or unbridged, bis- or mono-cyclopentadienyl (Cp) zirconium complex having at least two leaving groups $X_1$ and $X_2$, which are as defined immediately above and where the Cp groups may be substituted or unsubstituted cyclopentadiene, indene, or fluorene. The term titanocene describes a bridged or unbridged, bis- or mono-cyclopentadienyl (Cp) titanium complex having at least two leaving groups $X_1$ and $X_2$, which are as defined immediately above and where the Cp groups may be substituted or unsubstituted cyclopentadiene, indene, or fluorene.

Among the metallocene compounds which can be used in this invention are stereorigid, chiral or asymmetric, bridged or non-bridged, or so-called "constrained geometry" metallocenes. See, for example, U.S. Pat. Nos. 4,892,851; 5,017,714; 5,132,281; 5,155,080; 5,296,434; 5,278,264; 5,318,935; 5,969,070; 6,376,409; 6,380,120; 6,376,412; WO-A-(PCT/US92/10066); WO 99/07788; WO-A-93/19103; WO 01/48034; EP-A2-0 577 581; EP-A1-0 578 838; WO 99/29743; and also the academic literature, see e.g., "*The Influence of Aromatic Substituents on the Polymerization Behavior of Bridged Zirconocene Catalysts*", Spaleck, W., et al, Organometallics 1994, 13, pp. 954-963, and "*ansa-Zirconocene Polymerization Catalysts with Annelated Ring Ligands-Effects on Catalytic Activity and Polymer Chain Lengths*", Brintzinger, H., et al, Organometallics 1994, 13, pp. 964-970, and documents referred to therein. The bridged metallocenes disclosed in WO 99/07788 and the unbridged metallocenes disclosed in U.S. Pat. No. 5,969,070 are particularly suitable for the present invention.

Preferably, the transition metal compound is a dimethylsilylbis(indenyl) metallocene, wherein the metal is a Group 4 metal, specifically, titanium, zirconium, or hafnium, and the indenyl may be substituted by one or more substituents selected from the group consisting of a halogen atom, $C_1$ to $C_{10}$ alkyl, $C_5$ to $C_{15}$ aryl, $C_6$ to $C_{25}$ arylalkyl, and $C_6$ to $C_{25}$ alkylaryl. More preferably, the metal is zirconium or hafnium, $L_1$ and $L_2$ are unsubstituted or substituted indenyl radicals, T is dialkylsiladiyl, and $X_1$ and $X_2$ are both halogen or $C_1$ to $C_3$ alkyl. Preferably, these compounds are in the rac-form.

Illustrative, but not limiting examples of preferred metallocene compounds include dimethylsilylbis(indenyl) metal dichloride, -diethyl or -dimethyl, wherein the metal is titanium, zirconium, or hafnium, preferably hafnium or zirconium. In some embodiments, the indenyl radicals are not substituted by any further substituents; however, in certain embodiments the two indenyl groups may also be replaced, independently of each other, by 2-methyl-4-phenylindenyl; 2-methyl indenyl; 2-methyl,4-[3',5'-di-t-butylphenyl]indenyl; 2-ethyl-4-[3',5'-di-t-butylphenyl]indenyl; 2-n-propyl-4-[3',5'-di-t-butylphenyl]indenyl; 2-iso-propyl-4-[3',5'-di-t-butylphenyl]indenyl; 2-iso-butyl-4-[3',5'-di-t-butylphenyl]indenyl; 2-n-butyl-4-[3',5'-di-t-butylphenyl]indenyl; 2-sec-butyl-4-[3',5'-di-t-butylphenyl]indenyl; 2-methyl-4-[3',5'-di-phenylphenyl]indenyl; 2-ethyl-4-[3',5'-di-phenylphenyl]indenyl; 2-n-propyl-4-[3',5'-di-phenylphenyl]indenyl; 2-iso-propyl-4-[3',5'-di-phenylphenyl]indenyl; 2-n-butyl-4-[3',5'-di-phenylphenyl]indenyl; 2-sec-butyl-4-[3',5'-di-phenylphenyl]indenyl; 2-tert-butyl-4-[3',5'-di-phenylphenyl] indenyl; and the like. Further illustrative, but not limiting examples of preferred metallocene compounds are the racemic isomers of 9-silafluorenylbis(indenyl) metal dichloride, -diethyl or -dimethyl, wherein the metal is titanium, zirconium, or hafnium.

Particularly preferred metallocenes as transition metal compounds for use in the catalyst systems of the present invention together with the activators described above for use in polymerizing olefins are rac-dimethylsilylbis(indenyl) hafnocenes or -zirconocenes, rac-dimethylsilylbis(2-methyl-4-phenylindenyl) hafnocenes or -zirconocenes, rac-dimethylsilylbis(2-methyl-indenyl) hafnocenes or -zirconocenes, and rac-dimethylsilylbis(2-methyl-4-naphthylindenyl) hafnocenes or -zirconocenes, wherein the hafnium and zirconium metal is substituted, in addition to the bridged bis(indenyl) substituent, by two further substituents, which are halogen, preferably chlorine or bromine atoms, or alkyl groups, preferably methyl and/or ethyl groups. Preferably, these additional substituents are both chlorine atoms or both methyl groups. Particularly preferred transition metal compounds are dimethylsilylbis(indenyl)hafnium dimethyl, rac-dimethylsilylbis(indenyl)zirconium dimethyl, rac-ethylenylbis(indenyl)zirconium dimethyl, and rac-ethylenylbis(indenyl) hafnium dimethyl.

Illustrative, but not limiting examples of additional useful metallocene catalysts are: [dimethylsilanediyl(tetramethylcyclopentadienyl)-(cyclododecylamido)]metal dihalide, [dimethylsilanediyl(tetramethylcyclopentadienyl)(t-butylamido)]metal dihalide, [dimethylsilanediyl(tetramethylcyclopentadienyl)(exo-2-norbornyl)]metal dihalide, wherein the metal is Zr, Hf, or Ti, preferably Ti, and the halide is preferably chlorine or bromine In a preferred embodiment, the transition metal compound is a bridged or unbridged bis(substituted or unsubstituted indenyl) hafnium dialkyl or dihalide.

Finally, non-metallocene compounds that are active in catalyzing olefin polymerization reactions are suitable as the transition metal compound in the catalyst systems and the processes of the present invention. A particularly preferred species of non-metallocene catalysts includes the pyridyl amines disclosed, e.g., in WO 03/040201.

Additional organometallic transition metal compounds suitable as olefin polymerization catalysts in accordance with the invention will be any of those Group 4-10 that can be converted by ligand abstraction into a catalytically active cation and stabilized in that active electronic state by a non-coordinating or weakly coordinating anion sufficiently labile to be displaced by an olefinically unsaturated monomer such as ethylene. Exemplary compounds include those described in the patent literature. U.S. Pat. No. 5,318,935 describes bridged and unbridged bisamido transition metal catalyst compounds of Group 4 metals capable of insertion polymerization of α-olefins. International Patent Publications WO 96/23010; WO 97/48735; and Gibson, et. al., Chem. Comm., pp. 849-850 (1998), disclose diimine-based ligands for Group 8-10 metal compounds shown to be suitable for ionic activation and olefin polymerization. See also WO 97/48735. Transition metal polymerization catalyst systems from Group 5-10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. Bridged bis(arylamido) Group 4 compounds for olefin polymerization are described by D. H. McConville, et al, in Organometallics 1995, 14, pp. 5478-5480. Synthesis methods and compound characterization are presented. Further work appearing in D. H. McConville, et al, Macromolecules 1996, 29, pp. 5241-5243, described the bridged bis(arylamido) Group 4 compounds are active catalysts for polymerization of 1-hexene. Additional transition metal compounds suitable in accordance with the invention include those described in WO 96/40805. Each of these documents is incorporated by reference for the purposes of U.S. patent practice.

In a preferred embodiment herein, the catalyst system comprises at least two activators and at least one metallocene compound represented by the formula:

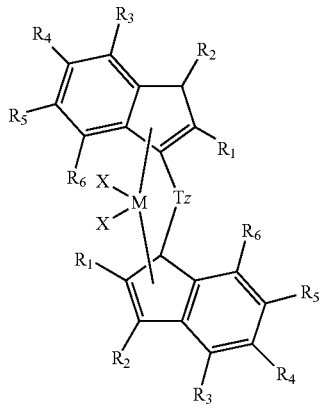

where:
M is hafnium or zirconium, preferably hafnium; z is 0 or 1 indicating the presence or absence of a bridging group, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_{12}$ alkyl or aromatic group, preferably each X is a methyl or benzyl group; each $R_1$ is, independently, hydrogen, or a $C_1$ to $C_{10}$ alkyl group, preferably hydrogen, methyl, ethyl, propyl, butyl, pentyl, hexyl, or isomers thereof, preferably each $R_1$ is a methyl group (preferably when z is 0, $R_1$ is H); each $R_2$, $R_3$, $R_4$, $R_5$, and $R_6$ is, independently, hydrogen or a substituted hydrocarbyl group or unsubstituted hydrocarbyl group, or a heteroatom, preferably each $R_4$, $R_5$, and $R_6$ is hydrogen; T is a bridging group, preferably T comprises Si, Ge, or C, preferably T is dialkyl silicon or dialkyl germanium, preferably T is dimethyl silicon; and further provided that any of adjacent $R_4$, $R_5$, and $R_6$ groups may form a fused ring or multicenter fused ring system where the rings may be aromatic, partially saturated or saturated.

Examples of bridging group T useful herein may be represented by $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, $R'C=CR'CR'_2CR'_2$, $R'_2CSiR'_2$, $R'_2SiSiR'_2$, $R_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C—BR'$, $R'_2C—BR'—CR'_2$, $R'_2C—O—CR'_2$, $R'_2CR'_2C—O—CR'_2CR'_2$, $R'_2C—O—CR'_2CR'_2$, $R'_2C—O—CR'=CR'$, $R'_2C—S—CR'_2$, $R'_2CR'_2C—S—CR'_2CR'_2$, $R'_2C—S—CR'_2CR'_2$, $R'_2C—S—CR'=CR'$, $R'_2C—Se—CR'_2$, $R'_2CR'_2C—Se—CR'_2CR'_2$, $R'_2C—Se—CR_2CR'_2$, $R'_2C—Se—CR'=CR'$, $R'_2C—N=CR'$, $R'_2C—NR'—CR'_2$, $R'_2C—NR'—CR'_2CR'_2$, $R'_2C—NR'—CR'=CR'$, $R'_2CR'_2C—NR'—CR'_2CR'_2$, $R'_2C—P=CR'$, and $R'_2C—PR'—CR'_2$ where R' is hydrogen or a $C_1$ to $C_{20}$ containing hydrocarbyl, substituted hydrocarbyl, halocarbyl, substituted halocarbyl, silylcarbyl or germylcarbyl substituent, and optionally two or more adjacent R' may join to form a substituted or unsubstituted, saturated, partially unsaturated or aromatic, cyclic or polycyclic substituent.

Preferably, T is a bridging group comprising carbon or silica, such as dialkylsilyl, preferably T is selected from $CH_2$, $CH_2CH_2$, $C(CH_3)_2$, $SiMe_2$, $SiPh_2$, $SiMePh$, silylcyclobutyl $(Si(CH_2)_3)$, $(Ph)_2C$, $(p-(Et)_3 SiPh)_2C$, and silylcyclopentyl $(Si(CH_2)_4)$.

Preferably T is represented by the formula $R_2^aJ$, where J is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system.

Metallocene compounds that are particularly useful in this invention include one or more of: dimethylsilylbis(indenyl)hafnium dimethyl; dimethylsilylbis(indenyl)zirconium dimethyl; dimethylsilylbis(2-methyl 4-phenylindenyl)hafnium dimethyl; dimethylsilylbis(2-methyl 4-phenylindenyl)zirconium dimethyl; bis(n-propyl-cyclopentadienyl)hafnium dimethyl; bis(n-propyl-cyclopentadienyl)zirconium dimethyl; dimethylsilylbis(2-methylindenyl)hafnium dimethyl; and dimethylsilylbis(2-methylindenyl)zirconium dimethyl. In an alternate embodiment, the "dimethyl" after the transition metal in the list of catalyst compounds above is replaced with a dihalide (such as dichloride or difluoride) or a bisphenoxide.

Non Coordinating Anion Activators

The catalyst systems of this invention include at least two non-coordinating anion activators. Specifically the catalyst systems include two NCAs which either do not coordinate to a cation or which only weakly coordinate to a cation thereby remaining sufficiently labile to be displaced during polymerization.

The terms "cocatalyst" and "activator" are used herein interchangeably and are defined to be any compound which can activate any one of the catalyst compounds described above by converting the neutral catalyst compound to a catalytically active catalyst compound cation.

In a preferred embodiment, little or no alumoxane is used in the process to produce the polymers herein. Preferably, alumoxane is present at zero mol %, alternately the alumoxane is present at a molar ratio of aluminum to transition metal of less than 500:1, preferably less than 300:1, preferably less than 100:1, or preferably less than 1:1.

Ionizing Activators

Activators useful herein include ionizing activators, which may be neutral or ionic. Preferred activators typically include ionizing anion precursor compounds that abstract one reactive, σ-bound, metal ligand making the metal complex cationic and providing a charge-balancing noncoordinating or weakly coordinating anion.

It is within the scope of this invention to use an ionizing or stoichiometric activator, neutral or ionic, such as tri(n-butyl) ammonium tetrakis(pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof.

Examples of neutral stoichiometric activators include tri-substituted boron, tellurium, aluminum, gallium and indium, or mixtures thereof. The three substituent groups are each independently selected from alkyls, alkenyls, halogen, substituted alkyls, aryls, arylhalides, alkoxy and halides. Preferably, the three groups are independently selected from halogen, mono- or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982; EP-A-0 520 732; EP-A-0 495 375; EP-B1-0 500 944; EP-A-0 277 003; EP-A-0 277 004; U.S. Pat. Nos. 5,153,157; 5,198, 401; 5,066,741; 5,206,197; 5,241,025; 5,384,299; 5,502,124; and U.S. patent application Ser. No. 08/285,380, filed Aug. 3, 1994, all of which are herein fully incorporated by reference.

Ionic catalysts can be prepared by reacting a transition metal compound with some neutral Lewis acids, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction. The catalysts can be, and preferably are, prepared with activator components which are ionic compounds or compositions. However, preparation of activators utilizing neutral compounds is also contemplated by this invention.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic, and acetylenically unsaturated substrates or other neutral Lewis bases, such as ethers, nitriles, and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core; and 2) anions comprising a plurality of boron atoms, such as carboranes, metallacarboranes and boranes.

In a preferred embodiment, the stoichiometric activators include a cation and an anion component, and may be represented by the following formula:

$$Z_d^+ (A^{d-}) \qquad (14)$$

where: Z is (L-H) or a reducible Lewis acid; L is a neutral Lewis base; H is hydrogen; (L-H) is a Bronsted acid; $A^{d-}$ is a non-coordinating anion having the charge d−; and d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted C1 to C40 hydrocarbyl), preferably the reducible Lewis acids in formula (14) above as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate, triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis (pentafluorophenyl)borate, tropillium tetrakis (pentafluorophenyl)borate, triphenylcarbenium tetrakis (pentafluorophenyl)borate, triphenylphosphonium tetrakis (pentafluorophenyl)borate, triethylsilylium tetrakis (pentafluorophenyl)borate, benzene(diazonium)tetrakis (pentafluorophenyl)borate, trimethylammonium tetrakis-(2, 3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl) borate, N,N-dimethylanilinium tetrakis-(2,3,4,6- tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate; and dialkyl ammonium salts such as: di-(1-propyl)ammonium tetrakis(pentafluorophenyl)borate, and dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator $Z_d^+$ ($A^{d-}$) is N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

In one embodiment, an activation method using ionizing ionic compounds not containing an active proton but capable of producing a bulky ligand metallocene catalyst cation and their non-coordinating anion is used and is described in EP 0 426 637 A; EP 0 573 403 A; and U.S. Pat. No. 5,387,568, which are all herein incorporated by reference.

Useful invention processes also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

When the cations of noncoordinating anion precursors are Bronsted acids, such as protons or protonated Lewis bases (excluding water), or reducible Lewis acids, such as carboniums, ferrocenium or silver cations, or alkali or alkaline earth metal cations, such as those of sodium, magnesium, or lithium, the catalyst-precursor-to-activator molar ratio may be any ratio.

Bulky activators are also useful herein as NCAs. "Bulky activator" as used herein refers to anionic activators represented by the formula:

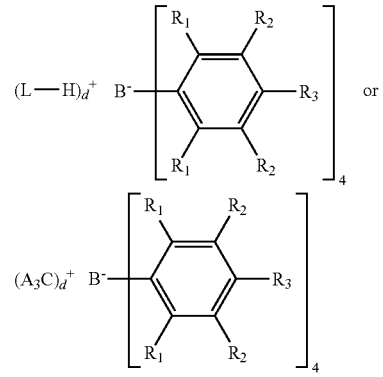

where:
each $R_1$ is, independently, a halide, preferably a fluoride;
Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and
L is an neutral Lewis base; (L-H)$^+$ is a Bronsted acid; d is 1, 2, or 3;

wherein the anion has a molecular weight of greater than 1020 g/mol;

wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_s$ | MV Per subst. (Å$^3$) | Total MV (Å$^3$) |
| --- | --- | --- | --- | --- | --- |
| Dimethylanilinium tetrakis(perfluoronaphthyl) borate | | $C_{10}F_7$ | 34 | 261 | 1044 |
| Dimethylanilinium tetrakis(perfluorobiphenyl) borate | | $C_{12}F_9$ | 42 | 349 | 1396 |
| [4-tButyl-PhNMe$_2$H] [$(C_6F_3(C_6F_5)_2)_4$B] | | $C_{18}F_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][(C$_6$F$_3$(C$_6$F$_5$)$_2$)$_4$B], and the activators disclosed in U.S. Pat. No. 7,297,653.

In another embodiment, one or more of the NCAs is chosen from the activators described in U.S. Pat. No. 6,211,105. Specifically the anion of the NCAs comprises a Group 13 element cocatalyst complex comprising at least one halogenated, nitrogen-containing aromatic group ligand. The Group 13 element cocatalyst complex can be a neutral, three-coordinate Lewis acid compound or it can be an ionic salt comprising a four-coordinate Group 13 element anionic complex, each containing at least one halogenated aromatic ligand having at least one nitrogen atom in the aromatic ring. Preferred Group 13 element cocatalyst complexes comprising at least one halogenated, nitrogen-containing aromatic group ligand are preferably represented by the formula:

$$R_nM(ArNHal)_{4-n} \quad (I)$$

where R is a monoanionic ligand, M is a Group 13 metal or metalloid, preferably aluminum or boron, ArNHal is a halogenated, nitrogen-containing aromatic ring, polycyclic aromatic ring or aromatic ring assembly in which two or more rings (or fused ring systems) are joined directly to one another or together, and n is 0, 1, 2, or 3. Suitable R ligands include: substituted or unsubstituted $C_1$ to $C_{30}$ hydrocarbyl aliphatic or aromatic groups, substituted meaning that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, alkylphosphido, or other anionic substituent; fluoride; bulky alkoxides, where bulky refers to $C_4$ and higher number hydrocarbyl groups, e.g., up to about $C_{20}$, such as tert-butoxide and 2,6-dimethylphenoxide, and 2,6-di(tert-butyl)phenoxide; —SR$^1$; —NR$^2{}_2$, and —PR$^3{}_2$, where each R is independently a substituted or unsubstituted hydrocarbyl as defined above; and $C_1$ to $C_{30}$ hydrocarbyl substituted organometalloid, such as trimethylsilyl, methyl trimethylsilyl, etc. Preferred examples of R include the halogenated phenyl, naphthyl, and anthracenyl radicals of U.S. Pat. No. 5,198,401 and the halogenated biphenyl radicals of WO 97/29845. The use of the terms halogenated or halogenation means that at least one third of hydrogen atoms on carbon atoms of the aryl-substituted aromatic ligands are replaced by halogen atoms, and more preferred that the aromatic ligands be perhalogenated. Fluorine is a preferred halogen.

In a preferred embodiment, ArNHal is a halogenated (preferably Cl, Br, F, preferably F), nitrogen-containing aromatic ring, polycyclic aromatic ring or aromatic ring assembly in which two or more rings (or fused ring systems) are joined directly to one another or together, preferably ArNHal is tetrafluoropyridine, hexafluoroquinoline, and/or hexafluoroisoquinoline.

Preferred Group 13 element activators useful herein are derived from an ionic salt, comprising a 4-coordinate Group 13 element anionic complex, that can be represented as:

$$[Ct]^+[R_{n^*}M(ArNHal)_{4-n^*}]^- \quad (II)$$

where $[Ct]^+$ is a is a suitable cation that is essentially non-interfering with the ionic catalyst complexes formed with the transition metal compounds, R, M, and ArNHal are defined as above, and n* is 0, 1, 2, or 3. Suitable cations for salts of the noncoordinating anions of the invention cocatalysts include those known in the art. Such include nitrogen-containing cations, such as those in the anilinium and ammonium salts of U.S. Pat. No. 5,198,401, and WO 97/35893; the carbenium, oxonium, or sulfonium cations of U.S. Pat. No. 5,387,568; metal cations, e.g., Ag$^+$; the silylium cations of WO 96/08519; and the cations of the hydrated salts of Group 1 or 2 metals of WO 97/22635. The teachings of these references are referred to for information and are incorporated by reference herein.

In a preferred embodiment, the NCA comprising an anion represented by Formula I is represented by the formula:

$$[Z_d]^+[R_{n^*}M(ArNHal)_{4-n^*}]^-$$

where Z is (L-H) or a reducible Lewis acid; L is a neutral Lewis base; H is hydrogen; (L-H) is a Bronsted acid; d is 1, 2, or 3, and R, M, and ArNHal are defined as above, and n* is 0, 1, 2, or 3.

The cation component, $[Z_d]^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $[Z_d]^+$ may also be a moiety such as silver, tropylium, carboniums, ferroceniums and mixtures, preferably carboniums and ferroceniums. Preferably $[Z_d]^+$ is triphenyl carbonium. Preferred reducible Lewis acids can be any triaryl carbonium (where the aryl can be substituted or unsubstituted, such as those represented by the formula: $[(Ar_3C)_d]^+$, where Ar is aryl or aryl substituted with a heteroatom, a $C_1$ to $C_{40}$ hydrocarbyl, or a substituted C1 to C40 hydrocarbyl), preferably $[Z_d]^+$ is represented by the formula $[(Ph_3C)_d]^+$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted C1 to C20 alkyls or aromatics, preferably Z is a triphenylcarbonium.

When $[Z_d]^+$ is the activating cation $[(L-H)_d]^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

In a preferred embodiment, the NCA that does not comprise an anion represented by Formula (I) is represented by the formula:

$$Z_d^+ (A^{d-})$$

where, Z is (L-H) or a reducible Lewis acid, L is an neutral Lewis base; H is hydrogen; (L-H) is a Bronsted acid; $A^{d-}$ is a boron containing non-coordinating anion having the charge d-d is 1, 2, or 3; where in the first NCA activator Z is a Bronsted acid and in the second NCA activator Z is a reducible Lewis acid, and Z, A and d are as further described above.

Optional Co-Activators and Scavengers

In addition to these activator compounds, scavengers or co-activators may be used. Aluminum alkyl or organoaluminum compounds which may be utilized as co-activators (or scavengers) include, for example, trimethylaluminum, triethylaluminum, triisobutylaluminum, tri-n-hexylaluminum, and tri-n-octylaluminum.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material, and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 µm. More preferably, the surface area of the support material is in the range of from about 50 to about 500 $m^2/g$, pore volume of from about 0.5 to about 3.5 cc/g and average particle size of from about 10 to about 200 µm. Most preferably the surface area of the support material is in the range is from about 100 to about 400 $m^2/g$, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$).

Useful silicas are marketed under the tradenames of DAVISON 952 or DAVISON 955 by the Davison Chemical Division of W.R. Grace and Company. In other embodiments, DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one metallocene compound and an activator.

Methods of Making the Supported Catalyst Systems

The support material, having reactive surface groups, typically hydroxyl groups, is slurried in a non-polar solvent and the resulting slurry is contacted with a solution of a metallocene compound and the activator(s). In some embodiments, the slurry of the support material is first contacted with the activator(s) for a period of time in the range of from about 0.5 hours to about 24 hours, from about 2 hours to about 16 hours, or from about 4 hours to about 8 hours. The solution of the metallocene compound is then contacted with the isolated support/activator(s). In some embodiments, the supported catalyst system is generated in situ.

The mixture of the metallocene, activator(s) and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In embodiments herein, the support material is contacted with a solution of a metallocene compound and activator(s), such that the reactive groups on the support material are titrated, to form a supported polymerization catalyst. The period of time for contact between the metallocene compound, the activator(s), and the support material is as long as is necessary to titrate the reactive groups on the support material. To "titrate" is meant to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the metallocene compound and the activator(s): the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.7 millimoles per gram (mmols/gm) is typically achieved. Thus, the exact molar ratio of the activator(s)

to the surface reactive groups on the carrier will vary. Preferably, this is determined on a case-by-case basis to assure that only so much of the activator(s) are added to the solution as will be deposited onto the support material without leaving excess of the activators in the solution.

The amount of the catalyst system or catalyst component which will be deposited onto the support material without leaving excess in the solution can be determined in any conventional manner, e.g., by adding the activator(s) to the slurry of the carrier in the solvent, while stirring the slurry, until the activator(s) are detected as a solution in the solvent by any technique known in the art, such as by $^1$H NMR. For example, for the silica support material heated at about 600° C., the amount of the activators added to the slurry is such that the molar ratio of boron to the hydroxyl groups (OH) on the silica is about 0.5:1 to about 4:1, preferably about 0.8:1 to about 3:1, more preferably about 0.9:1 to about 2:1 and most preferably about 1:1. The amount of boron on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, Eds., Butterworth-Heinemann, Boston, Mass., 1992, pp. 633-644. In another embodiment, it is also possible to add such an amount of activators which is in excess of that which will be deposited onto the support, and then remove, e.g., by filtration and washing, any excess of the activators.

In any of the above embodiments the catalyst compound(s) may be added to the support before, at the same time as, or after the activator(s); the activator(s) may be added to the support before, at the same time as, or after the catalyst compound(s); or the activator(s) and catalyst compound(s) may be alternated, grouped, or staggered, for example the first activator, the catalyst compound then the second activator, or the first activator and catalyst compound, then second activator.

Polymerization Processes

In embodiments herein, the invention relates to a process for polymerizing olefins, wherein the process comprises: contacting olefin monomer and optional comonomer(s) with a catalyst system comprising at least two activators and at least one transition metal compound (preferably a metallocene compound), where the transition metal compound is any of the compounds described above and preferably wherein polymer having at least two fractions that are different is obtained.

In a preferred embodiment, monomers and optional comonomers are selected from linear, branched or cyclic $C_2$ to $C_{40}$ olefins, preferably $C_2$ to $C_{20}$ olefins, preferably $C_2$ to $C_{12}$ olefins, preferably alpha olefins. In a preferred embodiment, the monomer is ethylene and the optional comonomer is one or more of $C_3$ to $C_{40}$ olefins, preferably $C_3$ to $C_{20}$ olefins, or preferably $C_3$ to $C_{12}$ olefins. In a preferred embodiment, the monomer is propylene and the optional comonomer(s) is one or more of ethylene and $C_4$ to $C_{40}$ olefins, preferably $C_4$ to $C_{20}$ olefins, or preferably $C_3$ to $C_{12}$ olefins. The comonomer(s) may be linear, branched, or cyclic. The cyclic monomer may be strained or unstrained, monocyclic or polycyclic, and may optionally include heteroatoms and/or one or more functional groups. Exemplary comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene. Preferred monomers include ethylene propylene, butene, hexene, octene, decent, dodecene, and the like.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); and perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; and cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

Additives may also be used in the processes described herein, such as one or more scavengers, promoters, modifiers, chain transfer agents, reducing agents, oxidizing agents, hydrogen, aluminum alkyls, or silanes.

Preferred polymerizations can be run at any temperature and/or pressure suitable to obtain the desired polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to about 250 minutes, or preferably from about 10 to about 120 minutes.

In a some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In an alternate embodiment, the activity of the catalyst is at least 50 g/mmol/hour, preferably 500 or more g/mmol/hour, preferably 5000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In addition to these activator compounds, scavengers or co-activators may be used. Aluminum alkyl or organoaluminum compounds which may be utilized as co-activators (or scavengers) include, for example, trimethylaluminum, triethylaluminum, triisobutylaluminum, tri-n-hexylaluminum, and tri-n-octylaluminum.

In a preferred embodiment, little or no scavenger is used in the process to produce the polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, preferably where aromatics are present in the solvent at less than 1 wt %, preferably less than 0.5 wt %, preferably at 0 wt % based upon the weight of the solvents); 4) wherein the catalyst system used in the polymerization comprises at least two NCA activators (as described herein) and preferably contains less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1); 5) the polymerization occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

In another embodiment, this invention relates to:

1. A catalyst system comprising a transition metal catalyst compound and at least two boron containing non-coordinating anion "NCA" activators represented by the formula: $Z_d^+$ $(A^{d-})$, where, Z is (L-H) or a reducible Lewis acid, L is an neutral Lewis base; H is hydrogen; (L-H) is a Bronsted acid; $A^{d-}$ is a boron containing non-coordinating anion having the charge d−; d is 1, 2, or 3; where in the first NCA activator Z is a Bronsted acid and in the second NCA activator Z is a reducible Lewis acid.

2. The catalyst system of paragraph 1, wherein the reducible Lewis acid is represented by the formula: $(Ar_3C^+)$, where Ar is aryl or aryl substituted with a heteroatom, a $C_1$ to $C_{40}$ hydrocarbyl or a substituted $C_1$ to $C_{40}$ hydrocarbyl, preferably the reducible Lewis acid is represented by the formula: $(Ph_3C^+)$, where Ph is phenyl or phenyl substituted with a heteroatom, a $C_1$ to $C_{40}$ hydrocarbyl or a substituted $C_1$ to $C_{40}$ hydrocarbyl.

3. The catalyst system of paragraph 1 or 2, wherein the second NCA activator $Z_d^+$ is triphenylcarbonium.

4. The catalyst system of paragraph 1, 2, or 3, wherein the first NCA activator $Z_d^+$ is represented by the formula: $(L-H)_d^+$, wherein L is an neutral Lewis base; H is hydrogen; (L-H) is a Bronsted acid; and d is 1, 2 or 3, preferably $(L-H)_d^+$ is a Bronsted acid selected from ammoniums, oxoniums, phosphoniums, silyliums, and mixtures thereof 5. The catalyst system of paragraph 1, 2, 3, or 4, wherein the anion component $A^{d-}$ is represented by the formula: $[M^{k+}Q_n]$ $d^-$, wherein k is 1, 2, or 3; n is 1, 2, 3, 4, 5, or 6 (preferably 1, 2, 3, or 4); n−k=d; M is boron, and Q is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide.

6. The catalyst system of paragraph 1, 2, 3, 4, or 5, wherein the two NCAs are $[Ph_3C^+][B(C_6F_5)_4^-]$ and $[Me_3NH^+][B(C_6F_5)_4^-]$; where Ph is phenyl and Me is methyl.

7. A method to polymerize olefins comprising contacting olefins with the catalyst system described in any of paragraphs 1 to 6 above.

8. The method of paragraph 7, wherein a polymer having multimodal molecular weight distribution is produced.

9. The method of paragraph 7 or 8, wherein the Mw of the polymer produced using two or more NCAs is at least 10,000 g/mol less that the Mw of both of the polymers produced under the same conditions using the NCAs alone.

10. The method of paragraph 7, 8, or 9, wherein the olefins are $C_2$ to $C_{40}$ olefins, preferably the olefins are one or more of ethylene, propylene, butene, pentene, hexene, heptene, octene, nonene, decene, undecene dodecene, and isomers thereof 11. A catalyst system comprising a transition metal catalyst compound and at least two non-coordinating anion "NCA" activators, where at least one NCA activator comprises an anion as described in Formula I and at least one NCA activator does not comprise an anion as described in Formula I, where Formula I is:

$$R_nM(ArNHal)_{4-n} \qquad (I)$$

where R is a monoanionic ligand; M is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3.

12. The catalyst system of paragraph 11, wherein the NCA that does not comprise an anion represented by Formula I is represented by the following formula: $Z_d^+(A^{d-})$, where Z is (L-H) or a reducible Lewis acid; L is an neutral Lewis base; H is hydrogen; (L-H) is a Bronsted acid; $A^{d-}$ is a boron containing non-coordinating anion having the charge d–; d is 1, 2, or 3; where, alternately, in the first NCA activator Z is a Bronsted acid and in the second NCA activator Z is a reducible Lewis acid.

13. The catalyst system of paragraph 12, wherein the reducible Lewis acid is represented by the formula: $(Ar_3C^+)$, where Ar is aryl or aryl substituted with a heteroatom; a $C_1$ to $C_{40}$ hydrocarbyl; or a substituted $C_1$ to $C_{40}$ hydrocarbyl; preferably the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

14. The catalyst system of paragraph 12, wherein $Z_d^+$ is triphenylcarbonium, preferably the two NCAs are triphenyl carbonium tetrakis(pentafluorophenyl)borate and 4-(tris (pentafluorophenyl)borate)-2,3,5,6-tetrafluoropyridine, or the two NCAs are $[Ph_3C^+][B(C_6F_5)_4^-]$ and 1-(4-(tris(pentafluorophenyl)borate)-2,3,5,6-tetrafluorophenyl)pyrrolidinium, where Ph is phenyl and Me is methyl.

15. The catalyst system of any of paragraphs 11 to 14, wherein M is B or Al and or ArNHal is one or more of tetrafluoropyridine, hexafluoroquinoline, or hexafluoroisoquinoline.

16. The catalyst system of any of paragraphs 11 to 15, wherein at least one NCA activator is represented by the formula:

$$[Z_d]^+[R_nM(ArNHal)_{4-n}]^-$$

where R is a monoanionic ligand; M is a Group 13 metal or metalloid; ArNHal is a halogenated, nitrogen-containing aromatic ring, polycyclic aromatic ring or aromatic ring assembly in which two or more rings (or fused ring systems) are joined directly to one another or together; n is 0, 1, 2, or 3; Z is (L-H) or a reducible Lewis acid; L is an neutral Lewis base; H is hydrogen; (L-H) is a Bronsted acid; and d is 1, 2, or 3.

17. The catalyst system of any of paragraphs 11 to 16, wherein R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, alkylphoshido, or other anionic substituent; fluoride; bulky alkoxides, where bulky means $C_4$ to $C_{20}$ hydrocarbyl groups; $—SR^1$; $—NR^2_2$, and $—PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

18. A method to polymerize olefins comprising contacting olefins with a catalyst system of any of paragraphs 11 to 17.

19. The method of paragraph 18, wherein a polymer having multimodal molecular weight distribution is produced.

20. The method of paragraph 18 or 19, wherein the Mw of the polymer produced using two or more NCAs is at least 10,000 g/mol less that the Mw of both of the polymers produced under the same conditions using the NCAs alone.

21. The method of paragraph 18, 19, or 20, wherein the olefins are $C_2$ to $C_{40}$ olefins, preferably the olefins are one or more of ethylene, propylene, butene, pentene, hexene, heptene, octene, nonene, decene, undecene dodecene, and isomers thereof 22. A catalyst system comprising a transition metal catalyst compound and at least two non-coordinating anion "NCA" activators, where the two NCA activators comprise an anion as described in Formula I except that the N in the second NCA in the ArNHal is at a different position in the nitrogen containing aromatic ring than the N in the ArNHal of the first NCA, where Formula I is:

$$R_nM(ArNHal)_{4-n} \qquad (I)$$

where R is a monoanionic ligand; M is a Group 13 metal or metalloid; ArNHal is a halogenated, nitrogen-containing aromatic ring, polycyclic aromatic ring or aromatic ring assembly in which two or more rings (or fused ring systems) are joined directly to one another or together; and n is 0, 1, 2, or 3.

23. The catalyst system of paragraph 22, wherein M is B or Al and/or ArNHal is one or more of tetrafluoropyridine, hexafluoroquinoline, or hexafluoroisoquinoline.

24. The catalyst system of any of paragraphs 22 to 23, wherein the NCA activators are represented by the formula:

$$[Z_d]^+[R_nM(ArNHal)_{4-n}]^-$$

where R is a monoanionic ligand; M is a Group 13 metal or metalloid; ArNHal is a halogenated, nitrogen-containing aromatic ring, polycyclic aromatic ring or aromatic ring assembly in which two or more rings (or fused ring systems) are joined directly to one another or together; n is 0, 1, 2, or 3; Z is (L-H) or a reducible Lewis acid; L is an neutral Lewis base; H is hydrogen; (L-H) is a Bronsted acid; and d is 1, 2, or 3.

25. The catalyst system of any of paragraphs 22 to 24, wherein R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, alkylphoshido, or other anionic substituent; fluoride; bulky alkoxides, where bulky means $C_4$ to $C_{20}$ hydrocarbyl groups; $—SR^1$; $—NR^2_2$, and $—PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

26. A method to polymerize olefins comprising contacting olefins with the catalyst system of paragraph 22, 23, 24, or 25.

27. The method of paragraph 26, wherein a polymer having multimodal molecular weight distribution is produced.

28. The method of paragraph 26 or 27, wherein the Mw of the polymer produced using two or more NCAs is at least 10,000 g/mol less that the Mw of both of the polymers produced under the same conditions using the NCAs alone.

29. The method of paragraph 26, 27, or 28, wherein the olefins are $C_2$ to $C_{40}$ olefins, preferably the olefins are one or more of ethylene, propylene, butene, pentene, hexene, heptene, octene, nonene, decene, undecene dodecene, and isomers thereof.

Examples

All molecular weights are weight average reported in g/mol unless otherwise noted. Room temperature is 23° C. unless otherwise noted.

General Procedures for High Through-Put Scale Experiments

Ethylene/1-octene copolymerizations were carried out in a parallel, pressure reactor, as generally described in U.S. Pat. Nos. 6,306,658; 6,455,316; 6,489,168; WO 00/09255; and Murphy et al., J. Am. Chem. Soc., 2003, 125, pp. 4306-4317, each of which is fully incorporated herein by reference for U.S. purposes. Although the specific quantities, temperatures, solvents, reactants, reactant ratios, pressures, and other variables may change from one polymerization run to the next, the following describes a typical polymerization performed in a parallel, pressure reactor.

A pre-weighed glass vial insert and disposable stirring paddle were fitted to each reaction vessel of the reactor, which contains 48 individual reaction vessels. The reactor was then closed and each vessel was individually heated to a set temperature (usually between 50 and 110° C.) and pressurized to a predetermined pressure of 1.38 MPa (usually between 75 and 400 psi) ethylene. If desired, 1-octene (100 microliters, 637 micromol) was injected into each reaction vessel through a valve, followed by enough solvent (typically toluene or isohexane) to bring the total reaction volume, including the subsequent additions, to 5 mL. Tri-n-octylaluminum in toluene (100 microliters, 10 mM in toluene, 1 micromol) was then added to act as a co-catalyst/scavenger, if used. The contents of the vessel were then stirred at 800 rpm. A toluene solution of catalyst (typically 0.40 mM in toluene, usually 20-40 nanomols of catalyst) along with 500 microliters of isohexane was then injected into the reaction vessel. A toluene solution of the activators (usually 1.0 molar equivalents dissolved in toluene) along with 500 microliters of isohexane was then injected into the reaction vessel. Equivalence is determined based on the molar equivalents relative to the moles of the transition metal in the catalyst complex.

The reaction was then allowed to proceed until a predetermined amount of ethylene (10 to 20 psi, 69 to 138 kPa) had been taken up by the reaction (ethylene pressure was maintained in each reaction vessel at the pre-set level by computer control). At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine comonomer incorporation, and by DSC (see below) to determine melting point (Tm).

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for U.S. purposes. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector. The molecular weights presented are relative to linear polystyrene standards and are uncorrected.

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minutes and then cooled at a rate of 50° C./min. Melting points were collected during the heating period.

The ratio of 1-octene to ethylene incorporated in the polymers (weight %) was determined by rapid FT-IR spectroscopy on a Bruker Equinox 55+ IR in reflection mode. Samples were prepared in a thin film format by evaporative deposition techniques. Weight percent 1-octene was obtained from the ratio of peak heights at 1378 and 4322 $cm^{-1}$. This method was calibrated using a set of ethylene/1-octene copolymers with a range of known wt % 1-octene content.

Examples

Figure 2:
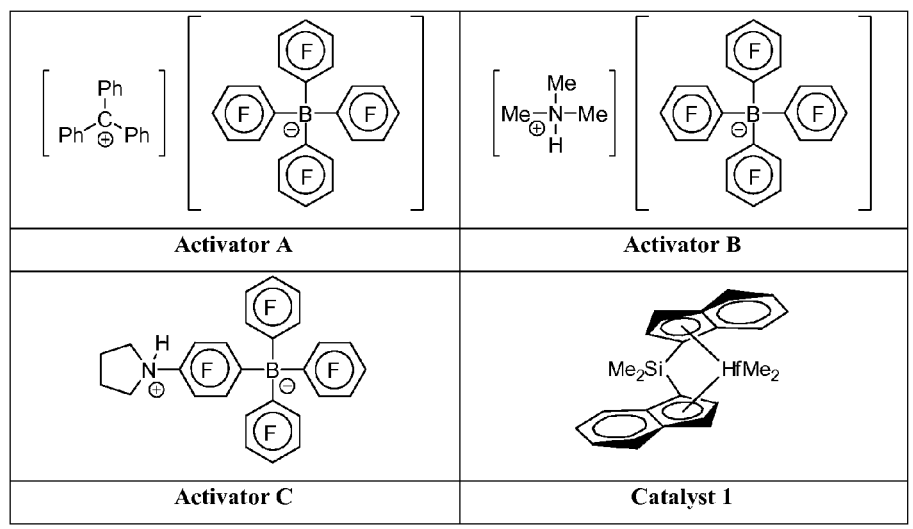
FIG. 2 is a chart of the activators and the catalysts used in Experiments 1-24.

The follow experiments were carried out following the general procedure above using 0.03 μmol of a single catalyst (Cat-1, rac-dimethylsilyl bisindenyl hafnium dimethyl) at a constant molar ratio of total activator to catalyst of 1:1. In the mixed activator experiments half a molar equivalent relative to catalyst of each activator was used, maintaining the 1:1 catalyst:activator ratio. The polymerization temperature was 80° C., the ethylene pressure was 150 psi (1034 kPa) and 0.1 ml of octene was used. The data are reported in Tables 1 and 2. The activators used were $[Ph_3C^+][B(C_6F_5)_4^-]$ (Activator A); $[Me_3NH^+][B(C_6F_5)_4^-]$ (Activator B); and 1-(4-(tris(pentafluorophenyl)borate)-2,3,5,6-tetrafluorophenyl)pyrrolidinium (Activator C as shown in FIG. 2, where Ph is phenyl, and Me is methyl).

TABLE 1A

Ethylene/Octene Polymerization with rac-dimethylsilyl-bis(indenyl)hafnium dimethyl

| Exp. No | Activator A | Activator A (μmol) | Activator B | Activator B (μmol) | Quench time (s) | yield (g) | Octene wt % |
|---|---|---|---|---|---|---|---|
| 1 | A | 0.03 | — | — | 91.9 | 0.1930 | 25.1 |
| 2 | A | 0.03 | — | — | 103.2 | 0.1932 | 23.8 |
| 3 | A | 0.03 | — | — | 100.9 | 0.1974 | 24.0 |
| 4 | A | 0.03 | — | — | 73.1 | 0.1705 | 26.0 |
| 5 | A | 0.015 | B | 0.015 | 136.8 | 0.1827 | 27.4 |
| 6 | A | 0.015 | B | 0.015 | 58.5 | 0.1546 | 20.6 |
| 7 | A | 0.015 | B | 0.015 | 98.3 | 0.1724 | 28.1 |
| 8 | A | 0.015 | B | 0.015 | 63.2 | 0.1602 | 22.5 |
| 9 | A | 0.015 | C | 0.015 | 89.1 | 0.1824 | 26.8 |

TABLE 1A-continued

Ethylene/Octene Polymerization with rac-dimethylsilyl-bis(indenyl)hafnium dimethyl

| Exp. No | Activator A | Activator A (μmol) | Activator B | Activator B (μmol) | Quench time (s) | yield (g) | Octene wt % |
|---|---|---|---|---|---|---|---|
| 10 | A | 0.015 | C | 0.015 | 42.1 | 0.1641 | 26.5 |
| 11 | A | 0.015 | C | 0.015 | 51.7 | 0.1720 | 26.9 |
| 12 | A | 0.015 | C | 0.015 | 41.9 | 0.1602 | 23.3 |
| 13 | B | 0.03 | — | — | 149.5 | 0.0562 | 15.2 |
| 14 | B | 0.03 | — | — | 140.1 | 0.0596 | 14.8 |
| 15 | B | 0.03 | — | — | 128.3 | 0.0685 | 15.4 |
| 16 | B | 0.03 | — | — | 151.0 | 0.0513 | 12.1 |
| 17 | B | 0.015 | C | 0.015 | 68.4 | 0.1136 | 18.4 |
| 18 | B | 0.015 | C | 0.015 | 93.1 | 0.0925 | 16.7 |
| 19 | B | 0.015 | C | 0.015 | 89.4 | 0.1125 | 18.4 |
| 20 | B | 0.015 | C | 0.015 | 84.1 | 0.0966 | 16.7 |
| 21 | C | 0.03 | — | — | 86.3 | 0.0754 | 16.1 |
| 22 | C | 0.03 | — | — | 124.9 | 0.0926 | 17.2 |
| 23 | C | 0.03 | — | — | 113.7 | 0.0879 | 15.8 |
| 24 | C | 0.03 | — | — | 131.8 | 0.0851 | 15.0 |

TABLE 1B

Ethylene/Octene Polymerization with rac-dimethylsilyl-bis(indenyl)hafnium dimethyl

| Exp. No | Average Mw | Average Mn | Average Mw/Mn | Tm (° C.) |
|---|---|---|---|---|
| 1 | 671030 | 239186 | 2.8 | 89.8 |
| 2 | 641057 | 232048 | 2.8 | 89.7 |
| 3 | 625092 | 199517 | 3.1 | 88.7 |
| 4 | 733432 | 301319 | 2.4 | 107.2 |
| 5 | 545361 | 138059 | 4.0 | 90.9 |
| 6 | 622064 | 281981 | 2.2 | 89.2 |
| 7 | 365219 | 93868 | 3.9 | 88.1 |
| 8 | 563210 | 178501 | 3.2 | 91.3 |
| 9 | 547166 | 158971 | 3.4 | 92.0 |
| 10 | 444560 | 124864 | 3.6 | 90.4 |
| 11 | 483977 | 131254 | 3.7 | 89.1 |
| 12 | 517114 | 148672 | 3.5 | 94.1 |
| 13 | 1007598 | 676467 | 1.5 | 95.3 |
| 14 | 1000738 | 669130 | 1.5 | 93.8 |
| 15 | 957442 | 639185 | 1.5 | 93.1 |
| 16 | 1092771 | 740155 | 1.5 | 99.4 |
| 17 | 740150 | 462343 | 1.6 | 88.5 |
| 18 | 833351 | 544619 | 1.5 | 90.1 |
| 19 | 750623 | 476553 | 1.6 | 87.3 |
| 20 | 822801 | 530594 | 1.6 | 91.3 |
| 21 | 768082 | 503227 | 1.5 | 91.8 |
| 22 | 711931 | 461262 | 1.5 | 91.3 |
| 23 | 746823 | 485490 | 1.5 | 92.5 |
| 24 | 761258 | 494022 | 1.5 | 95.3 |

Figure 3:
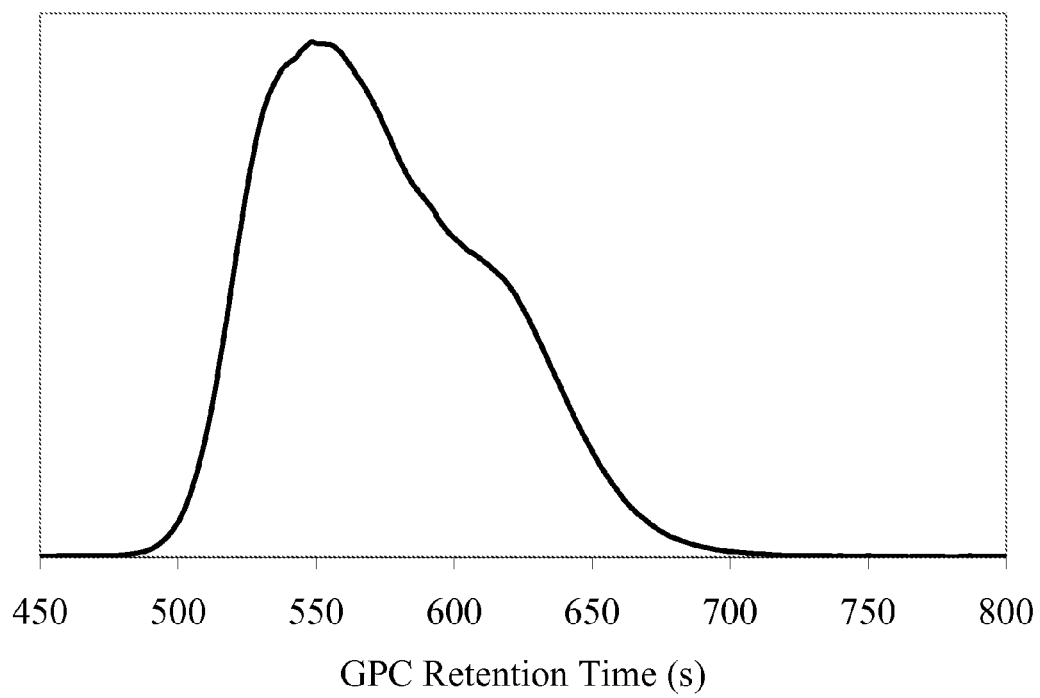
FIG. 3 is the GPC trace for the mixed activator experiment (Activators A+C) of Example 11.

GPC analysis of the polymers from experiments using multiple activators shows bimodal distributions or increased PDI (Mw/Mn). The GPC trace of Experiment 11 is shown in FIG. 3.

Figure 4:
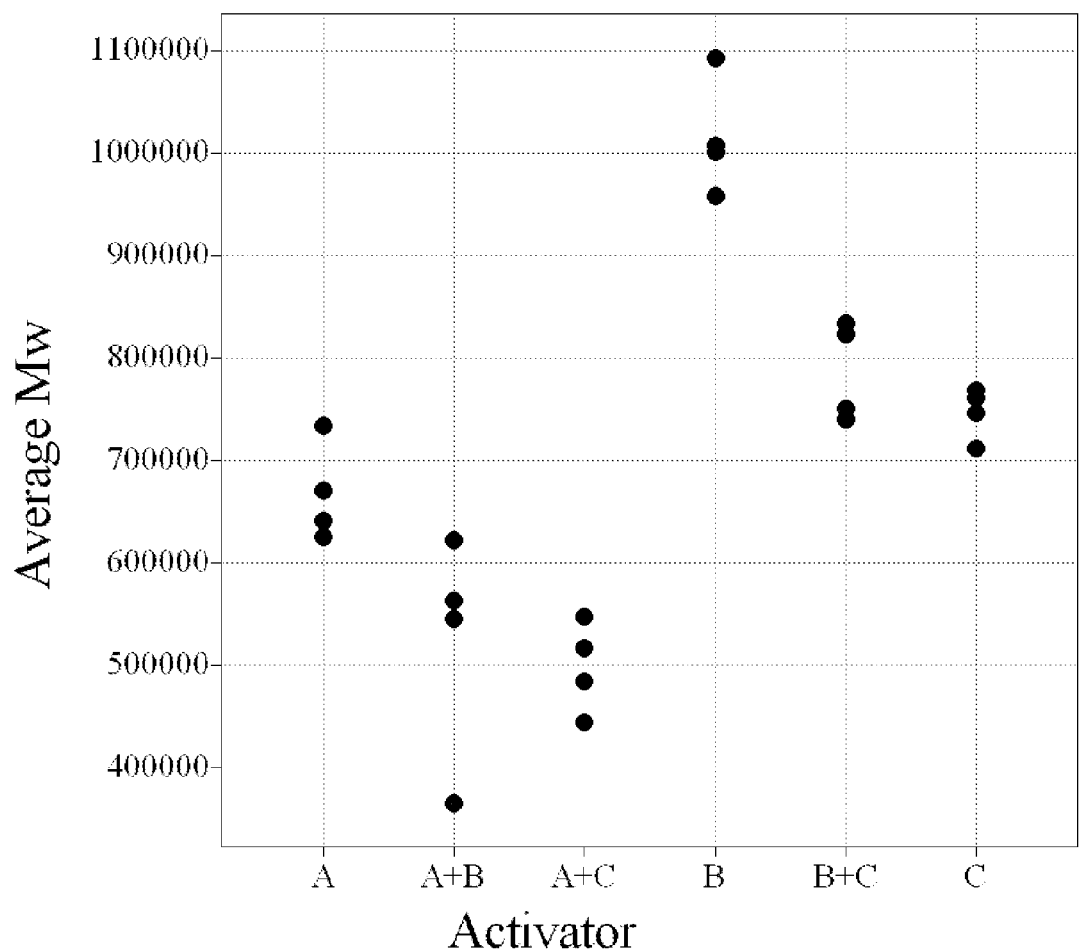
FIG. 4 is a chart of the Mw's of polymers produced in Examples 1-24.
Figure 5:
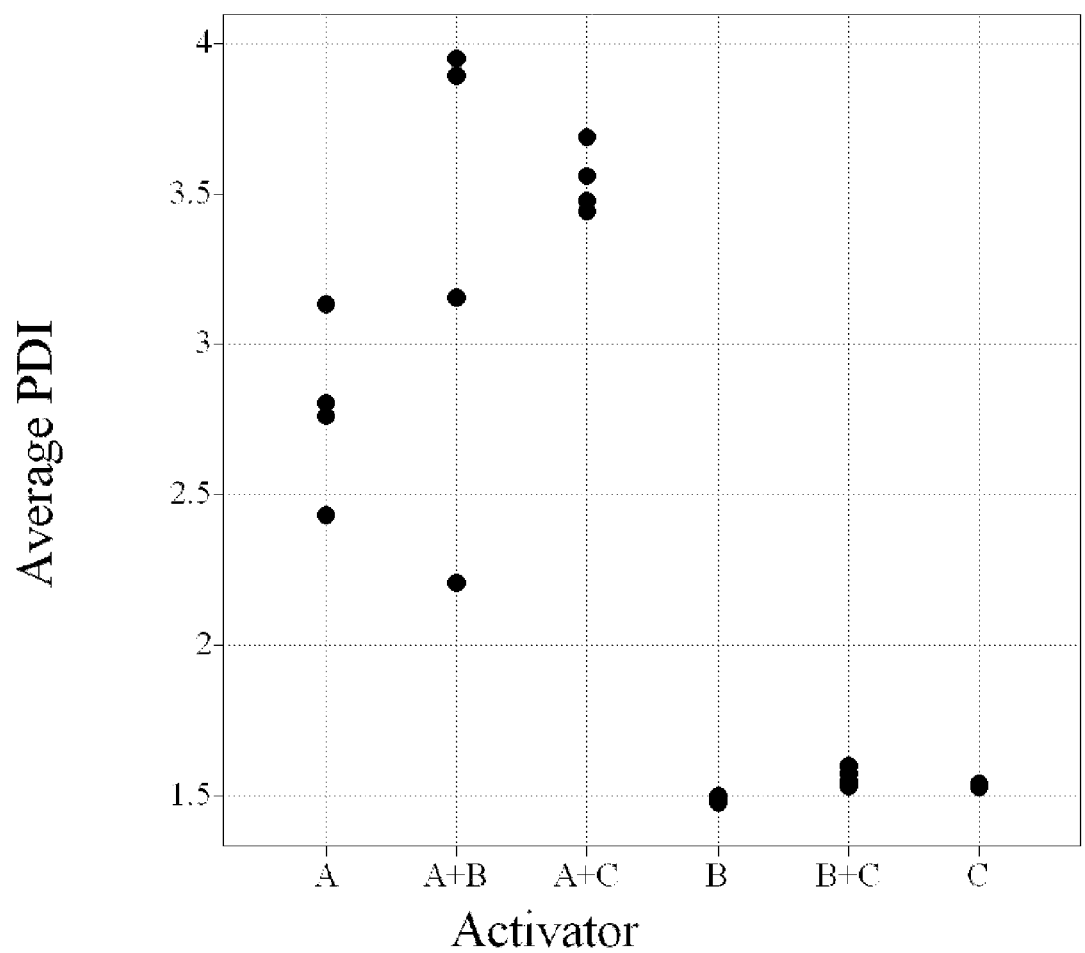
FIG. 5 is a chart of the PDIs (Mw/Mn) of polymers produced in Examples 1-24.

The Mw (FIG. 4), PDI (Mw/Mn)) (FIG. 5), and comonomer incorporation (FIG. 6) data are shown graphically in FIGS. 4, 5, and 6. The effect of multiple activators on a single catalyst is not simply an averaging of the polymer formed when using either of the activators alone.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A method to polymerize olefins comprising contacting one or more olefins with a catalyst system comprising a transition metal catalyst compound and at least two boron containing non-coordinating anion "NCA" activators represented by the formula:

$$(Z^+)_d 1(A^{d-})$$

where: Z is (L-H) or a reducible Lewis acid; L is an neutral Lewis base; H is hydrogen; (L-H) is a Bronsted acid; $A^{d-}$ is a boron containing non-coordinating anion having the charge d−; and d is 1, 2, or 3;

where in the first NCA activator Z is a Bronsted acid and in the second NCA activator Z is a reducible Lewis acid.

2. The method of claim 1, wherein a polymer having multimodal molecular weight distribution is produced.

3. The method of claim 1, wherein the Mw of the polymer produced using two or more NCAs is at least 10,000 g/mol less than the Mw of both of the polymers produced under the same conditions using the NCAs alone.

4. The method of claim 1, wherein the olefins comprise ethylene and/or propylene.

5. The method of claim 1, wherein the olefins are one or more of ethylene, propylene, butene, pentene, hexene, heptene, octene, nonene, decene, undecene dodecene, and isomers thereof.

6. The method of claim 1, wherein the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

7. The method of claim 1, wherein in the second NCA activator $(Z^+)_d$ is triphenylcarbonium.

8. The method of claim 1, wherein in the first NCA activator $(Z^+)_d$ is represented by the formula: $(L-H)_d^+$, wherein L is a neutral Lewis base; H is hydrogen; (L-H) is a Bronsted acid; and d is 1, 2, or 3.

9. The method of claim 7, wherein $(L-H)_d^+$ is a Bronsted acid selected from ammoniums, oxoniums, phosphoniums, silyliums, and mixtures thereof.

10. The method of claim 1, wherein the anion component $A^{d-}$ is represented by the formula $[M^{k+}Q_n]^{d-}$ wherein k is 3; n is 1, 2, 3, 4, 5, or 6; n−k=d; M is boron; and Q is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide.

11. The method of claim 1, wherein the two NCAs are $[Ph_3C^+][B(C_6F_5)_4^-]$ and $[Me_3NH^+][B(C_6F_5)_4^-]$ where Ph is phenyl and Me is methyl.

12. The method of claim 1, wherein the reducible Lewis acid is represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

13. A catalyst system comprising a transition metal catalyst compound and at least two boron containing non-coordinating anion "NCA" activators represented by the formula:

$(Z^+)_d(A^{d-})$ where: Z is (L-H) or a reducible Lewis acid; L is an neutral Lewis base; H is hydrogen; (L-H) is a Bronsted acid; $A^{d-}$ is a boron containing non-coordinating anion having the charge d−; and d is 1, 2, or 3;

where in the first NCA activator Z is a Bronsted acid and in the second NCA activator Z is a reducible Lewis acid.

14. The catalyst system of claim 13, wherein the reducible Lewis acid is represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

15. The catalyst system of claim 13, wherein the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

16. The catalyst system of claim 13, wherein, for the second NCA activators, $(Z^+)_d$ is triphenylcarbonium.

17. A method to polymerize olefins comprising contacting one or more olefins with a catalyst system comprising a transition metal catalyst compound and at least two non-coordinating anion "NCA" activators, where at least one NCA activator comprises an anion as described in Formula I and at least one NCA activator does not comprise an anion as described in Formula I, where Formula I is:

$R_nM(ArNHal)_{4-n}$     (I)

where R is a monoanionic ligand; M is a Group 13 metal or metalloid; ArNHal is a halogenated, nitrogen-containing aromatic ring, polycyclic aromatic ring or aromatic ring assembly in which two or more rings (or fused ring systems) are joined directly to one another or together; and n is 0, 1, 2, or 3.

18. The method of claim 17, wherein a polymer having multimodal molecular weight distribution is produced.

19. The method of claim 17, wherein the olefins comprise ethylene and or propylene.

20. The method of claim 17, wherein the olefins are one or more of ethylene, propylene, butene, pentene, hexene, heptene, octene, nonene, decene, undecene dodecene, and isomers thereof.

21. The method of claim 17, wherein R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, alkylphosphido or other anionic substituent; fluoride; bulky alkoxides, where bulky means $C_4$ to $C_{20}$ hydrocarbyl groups; $-SR^1$; $-NR^2_2$, and $-PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

22. The method of claim 17, wherein M is B or Al.

23. The method of claim 17, wherein ArNHal is one or more of tetrafluoropyridine, hexafluoroquinoline, or hexafluoroisoquinoline.

24. The method of claim 17, wherein the NCA that does not comprise an anion represented by Formula I is represented by the formula:

$(Z^+)_d(A^{d-})$ where: Z is (L-H) or a reducible Lewis acid; L is an neutral Lewis base; H is hydrogen; (L-H) is a Bronsted acid; $A^{d-}$ is a boron containing non-coordinating anion having the charge d−; and d is 1, 2, or 3.

25. The method of claim 24, wherein $(Z^+)_d$ is triphenylcarbonium.

26. A catalyst system comprising a transition metal catalyst compound and at least two non-coordinating anion "NCA" activators, where at least one NCA activator comprises an anion as described in Formula I and at least one NCA activator does not comprise an anion as described in Formula I, where Formula I is:

$R_nM(ArNHal)_{4-n}$     (I)

where R is a monoanionic ligand; M is a Group 13 metal or metalloid; ArNHal is a halogenated, nitrogen-containing aromatic ring, polycyclic aromatic ring or aromatic ring assembly in which two or more rings (or fused ring systems) are joined directly to one another or together; and n is 0, 1, 2, or 3.

27. The catalyst system of claim 26, wherein the NCA that does not comprise an anion represented by Formula I is represented by the formula:

$(Z^+)_d(A^{d-})$ where:
Z is (L-H) or a reducible Lewis acid; L is an neutral Lewis base; H is hydrogen; (L-H) is a Bronsted acid; $A^{d-}$ is a boron containing non-coordinating anion having the charge d−; and d is 1, 2, or 3.

28. The catalyst system of claim 26, wherein $(Z^+)_d$ is triphenylcarbonium.

29. The catalyst system of claim 26, wherein M is B or Al.

30. The catalyst system of claim 26, wherein ArNHal is one or more of tetrafluoropyridine, hexafluoroquinoline, or hexafluoroisoquinoline.

31. A method to polymerize olefins comprising contacting one or more olefins with a catalyst system comprising a transition metal catalyst compound and at least two non-coordinating anion "NCA" activators, where the two NCA activators each comprise anions as described in Formula I except that the N in the second NCA in the ArNHal is at a different position in the nitrogen containing aromatic ring than the N in the ArNHal of the first NCA, where Formula I is:

$R_nM(ArNHal)_{4-n}$     (I)

where R is a monoanionic ligand; M is a Group 13 metal or metalloid; ArNHal is a halogenated, nitrogen-containing aromatic ring, polycyclic aromatic ring or aromatic ring assembly in which two or more rings (or fused ring systems) are joined directly to one another or together; and n is 0, 1, 2, or 3.

32. The method of claim 31, wherein a polymer having multimodal molecular weight distribution is produced.

33. The method of claim 31, wherein the olefins comprise ethylene and/or propylene.

34. The method of claim 31, wherein the olefins are one or more of ethylene, propylene, butene, pentene, hexene, heptene, octene, nonene, decene, undecene dodecene, and isomers thereof.

35. The method of claim 31, wherein R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, alkylphosphido or other anionic substituent; fluoride; bulky alkoxides, where bulky means $C_4$ to $C_{20}$ hydrocarbyl groups; $-SR^1$;

—NR²₂, and —PR³₂, where each R¹, R², or R³ is independently a substituted or unsubstituted hydrocarbyl as defined above; or a $C_1$ to $C_{30}$ hydrocarbyl substituted organometalloid.

36. The method of claim 31, wherein M is B or Al.

37. The method of claim 21, wherein ArNHal is one or more of tetrafluoropyridine, hexafluoroquinoline, or hexafluoroisoquinoline.

38. A catalyst system comprising a transition metal catalyst compound and at least two non-coordinating anion "NCA" activators, where the two NCA activators each comprise anions as described in Formula I except that the N in the second NCA in the ArNHal is at a different position in the nitrogen containing aromatic ring than the N in the ArNHal of the first NCA, where Formula I is:

$$R_nM(ArNHal)_{4-n} \qquad (I)$$

where R is a monoanionic ligand; M is a Group 13 metal or metalloid; ArNHal is a halogenated, nitrogen-containing aromatic ring, polycyclic aromatic ring or aromatic ring assembly in which two or more rings (or fused ring systems) are joined directly to one another or together; and n is 0, 1, 2, or 3.

39. The catalyst system of claim 38, wherein M is B or Al.

40. The catalyst system of claim 38, wherein ArNHal is one or more of tetrafluoropyridine, hexafluoroquinoline, or hexafluoroisoquinoline.

41. The method of claim 17, wherein the two NCAs are triphenyl carbonium tetrakis(pentafluorophenyl)borate and triphenyl carbonium 4-(tris(pentafluorophenyl)borate)-2,3,5,6-tetrafluoropyridine, where Ph is phenyl and Me is methyl.

42. The method of claim 17, wherein the two NCAs are $[Ph_3C^+][B(C_6F_5)_4^-]$ and 1-(4-(tris(pentafluorophenyl)borate)-2,3,5,6-tetrafluorophenyl)pyrrolidinium.

43. The method of claim 17, wherein the NCA activator comprising an anion represented by Formula I is represented by the formula:

$$[Z_d]^+[R_nM(ArNHal)_{4-n}]^-$$

where R is a monoanionic ligand; M is a Group 13 metal or metalloid; ArNHal is a halogenated, nitrogen-containing aromatic ring, polycyclic aromatic ring or aromatic ring assembly in which two or more rings (or fused ring systems) are joined directly to one another or together; n is 0, 1, 2, or 3; Z is (L-H) or a reducible Lewis acid; L is an neutral Lewis base; H is hydrogen; (L-H) is a Bronsted acid; and d is 1, 2, or 3.

44. The catalyst system of claim 13, wherein the two NCAs are $[Ph_3C^+][B(C_6F_5)_4^-]$ and $[Me_3NH^+][B(C_6F_5)_4^-]$ where Ph is phenyl and Me is methyl.

45. The method of claim 31, wherein the NCA activators comprising an anion represented by Formula I are each independently represented by the formula:

$$[Z_d]^+[R_nM(ArNHal)_{4-n}]^-$$

where R is a monoanionic ligand; M is a Group 13 metal or metalloid; ArNHal is a halogenated, nitrogen-containing aromatic ring, polycyclic aromatic ring or aromatic ring assembly in which two or more rings (or fused ring systems) are joined directly to one another or together; n is 0, 1, 2, or 3; Z is (L-H) or a reducible Lewis acid; L is an neutral Lewis base; H is hydrogen; (L-H) is a Bronsted acid; and d is 1, 2, or 3.

\* \* \* \* \*